(12) United States Patent
Biesinger et al.

(10) Patent No.: US 11,833,975 B2
(45) Date of Patent: Dec. 5, 2023

(54) HOUSING MOUNTING ASSEMBLY FOR A VEHICLE SEAT

(71) Applicant: Munchkin, Inc., Van Nuys, CA (US)

(72) Inventors: Quinn Michael Biesinger, Los Angeles, CA (US); Alan Dean Borelli, San Leandro, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 500 days.

(21) Appl. No.: 16/802,379

(22) Filed: Feb. 26, 2020

(65) Prior Publication Data

US 2020/0198541 A1 Jun. 25, 2020

Related U.S. Application Data

(63) Continuation of application No. 15/904,194, filed on Feb. 23, 2018.

(60) Provisional application No. 62/462,879, filed on Feb. 28, 2017.

(51) Int. Cl.
| | | |
|---|---|---|
| *B60R 11/00* | (2006.01) | |
| *B60R 1/12* | (2006.01) | |
| *B60H 1/00* | (2006.01) | |
| *A47G 1/02* | (2006.01) | |
| *B60R 1/04* | (2006.01) | |

(52) U.S. Cl.
CPC ............ *B60R 11/00* (2013.01); *A47G 1/02* (2013.01); *B60H 1/00521* (2013.01); *B60R 1/04* (2013.01); *B60R 1/12* (2013.01); *B60R 2011/0017* (2013.01); *B60R 2011/0049* (2013.01); *B60R 2011/0059* (2013.01); *B60R 2011/0071* (2013.01)

(58) Field of Classification Search
CPC .. B60R 1/12; B60R 1/04; B60R 11/00; B60R 2011/0059; B60R 2011/0071; B60R 2011/0017; B60R 2011/0049; A47G 1/00; A47G 1/02; B60H 1/00521; F24F 2221/38; F04D 28/084; F04D 28/08
USPC .............................................. 454/69; 224/275
See application file for complete search history.

(56) References Cited

U.S. PATENT DOCUMENTS

| | | | |
|---|---|---|---|
| 1,446,164 A | 2/1923 | Eyraud | |
| 1,749,868 A | 3/1930 | Anderson | |
| 2,097,419 A | 10/1937 | Schmidt | |
| 2,315,095 A * | 3/1943 | Rhodes | ................... A45F 5/021 |
| | | | 224/664 |
| 2,629,286 A | 2/1953 | Budreck | |
| 3,273,891 A | 9/1966 | Grim, Jr. | |

(Continued)

FOREIGN PATENT DOCUMENTS

| | | |
|---|---|---|
| CN | 2280031 Y | 4/1998 |
| CN | 201718644 U | 1/2011 |

(Continued)

*Primary Examiner* — Edelmira Bosques
*Assistant Examiner* — Frances F. Hamilton
(74) *Attorney, Agent, or Firm* — Robert Z. Evora

(57) ABSTRACT

A housing mounting assembly adapted to connect to a seat in a vehicle. The mounting assembly may have a panel disposed within the housing. The housing mounting assembly may have a flap attached to the housing and at least one strap attached between the housing and the flap. The housing mounting assembly may have a securing device attached to the flap to secure the mounting assembly to the seat in the vehicle.

10 Claims, 22 Drawing Sheets

(56) References Cited

U.S. PATENT DOCUMENTS

| | | |
|---|---|---|
| 3,790,117 A | 2/1974 | Winkler |
| 4,125,244 A | 11/1978 | Lukey |
| 4,205,670 A * | 6/1980 | Owens .................. B60R 22/105 297/464 |
| 4,359,266 A | 11/1982 | Rohlf |
| 4,383,626 A | 5/1983 | Weinblatt |
| 4,401,289 A | 8/1983 | Fisher et al. |
| 4,623,177 A | 11/1986 | McKinney |
| 4,624,539 A | 11/1986 | King et al. |
| 4,661,072 A * | 4/1987 | White .................... A63H 33/00 434/260 |
| 4,681,368 A | 7/1987 | Heath et al. |
| 4,701,594 A | 10/1987 | Powel |
| 4,702,572 A | 10/1987 | Cossey |
| 4,712,892 A | 12/1987 | Masucci |
| 4,733,956 A | 3/1988 | Erickson |
| 4,902,118 A | 2/1990 | Harris |
| 4,909,618 A | 3/1990 | Gardner |
| 4,981,279 A | 1/1991 | Andreas et al. |
| 5,090,300 A | 2/1992 | Berenstien |
| 5,103,347 A | 4/1992 | Lumbra et al. |
| 5,106,177 A | 4/1992 | Dolasia |
| 5,165,081 A | 11/1992 | Drumheller |
| 5,285,321 A | 2/1994 | Nolan-Brown |
| 5,329,947 A | 7/1994 | Shikler |
| 5,363,246 A | 11/1994 | Perry et al. |
| 5,576,898 A | 11/1996 | Rubin |
| 5,604,633 A | 2/1997 | Christianson |
| 5,629,810 A | 5/1997 | Perry et al. |
| 5,668,526 A | 9/1997 | Collins |
| 6,006,462 A | 12/1999 | Lackomar |
| 6,022,116 A | 2/2000 | Osborn |
| 6,026,528 A * | 2/2000 | Pina ....................... A47D 15/00 5/503.1 |
| 6,030,085 A | 2/2000 | Leam et al. |
| 6,039,455 A | 3/2000 | Sorenson |
| 6,092,705 A * | 7/2000 | Meritt .................. B60R 11/0211 296/37.16 |
| 6,120,155 A | 9/2000 | Brennan |
| 6,217,180 B1 | 4/2001 | Eisenbraum |
| 6,220,717 B1 | 4/2001 | Pastore |
| 6,252,730 B1 | 6/2001 | Chabot |
| 6,283,622 B1 * | 9/2001 | Chupp .................... B60Q 3/233 362/136 |
| 6,305,810 B1 | 10/2001 | Mercado |
| 6,354,708 B1 | 3/2002 | Monahan et al. |
| 6,478,435 B2 | 11/2002 | Monahan et al. |
| 6,485,154 B1 | 11/2002 | Nolan-Brown |
| 6,491,403 B2 | 12/2002 | Edgar |
| 6,554,357 B2 | 4/2003 | Moffa |
| 6,585,384 B2 | 7/2003 | Nielsen |
| 6,619,605 B2 | 9/2003 | Lambert |
| 6,715,377 B1 | 4/2004 | Brouwer |
| 6,773,123 B1 | 8/2004 | Hatchett |
| 6,779,900 B1 * | 8/2004 | Nolan-Brown ......... B60R 1/008 359/872 |
| 6,824,281 B2 | 11/2004 | Schofield et al. |
| 6,857,753 B2 | 2/2005 | Kane |
| 6,913,364 B2 | 7/2005 | Kane |
| 7,097,314 B1 * | 8/2006 | Darling ................... B60R 1/008 359/872 |
| 7,862,189 B1 * | 1/2011 | Freese .................. G02B 7/1822 359/872 |
| 8,128,245 B2 | 3/2012 | Limjoco |
| D738,118 S | 9/2015 | Gyanendra et al. |
| 2001/0008266 A1 | 7/2001 | Lambert |
| 2003/0039041 A1 * | 2/2003 | Darling ................... B60R 1/008 359/860 |
| 2003/0226148 A1 * | 12/2003 | Ferguson ............ B60R 11/0235 725/77 |
| 2004/0016782 A1 * | 1/2004 | Hsu ..................... B60R 11/0235 224/275 |
| 2004/0036992 A1 * | 2/2004 | Darling ................... B60R 1/008 359/872 |
| 2004/0144817 A1 * | 7/2004 | Albert ................. B60R 11/0235 224/275 |
| 2005/0011920 A1 * | 1/2005 | Feng ................... B60R 11/0252 224/929 |
| 2006/0208020 A1 * | 9/2006 | Albert ..................... B60R 11/02 224/572 |
| 2007/0120038 A1 * | 5/2007 | Wang .................. B60R 11/0235 248/690 |
| 2008/0287032 A1 * | 11/2008 | Parness ................. A63H 33/006 446/219 |
| 2013/0009445 A1 * | 1/2013 | Cooper ................. A61H 1/0229 128/95.1 |
| 2014/0118548 A1 * | 5/2014 | Veneziano .............. B60R 1/008 348/148 |
| 2014/0151418 A1 * | 6/2014 | Yang ....................... B60R 11/02 224/275 |
| 2015/0175081 A1 * | 6/2015 | Rodriguez ................ A45F 3/02 224/275 |
| 2015/0230424 A1 * | 8/2015 | Hartelius ................ B60R 22/10 248/505 |

FOREIGN PATENT DOCUMENTS

| | | | |
|---|---|---|---|
| CN | 202483912 U | | 10/2012 |
| CN | 20306385 U * | 7/2013 | ............ B60R 11/02 |
| DE | 10356239 A1 * | 7/2005 | ........... B60N 2/4876 |
| FR | 2707570 A1 * | 1/1995 | ........... B60N 2/4876 |
| FR | 2925423 A3 * | 6/2009 | ............ B60R 7/043 |
| GB | 2411582 A * | 9/2005 | ............ A47D 1/008 |
| WO | 2003018362 | | 3/2003 |

* cited by examiner

HOUSING MOUNTING ASSEMBLY FOR A VEHICLE SEAT

CROSS REFERENCE TO RELATED APPLICATION

This application claims priority to U.S. patent application Ser. No. 15/904,194, entitled "MIRROR WITH INTEGRATED FAN" filed Feb. 23, 2018; and to U.S. Provisional Application Ser. No. 62/462,879 filed Feb. 23, 2017, the contents of which are hereby incorporated by reference herein in their entirety into this disclosure.

TECHNICAL FIELD

The subject disclosure relates generally to the field of vehicle seat mounting assemblies. In particular, the subject disclosure relates to a mounting assembly having a panel, that may contain a mirror, or various other features adapted for use in a vehicle.

SUMMARY

A vehicle seat mounting assembly having a housing, a panel and attachment means for securing the mounting assembly to a seat in a vehicle.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figures. As shown in FIGS. 1-10, an exemplary embodiment of the present subject disclosure is a fan mirror assembly 10. The fan mirror assembly 10 has a fan 100 integrated into a mirror assembly.

Figure 1:
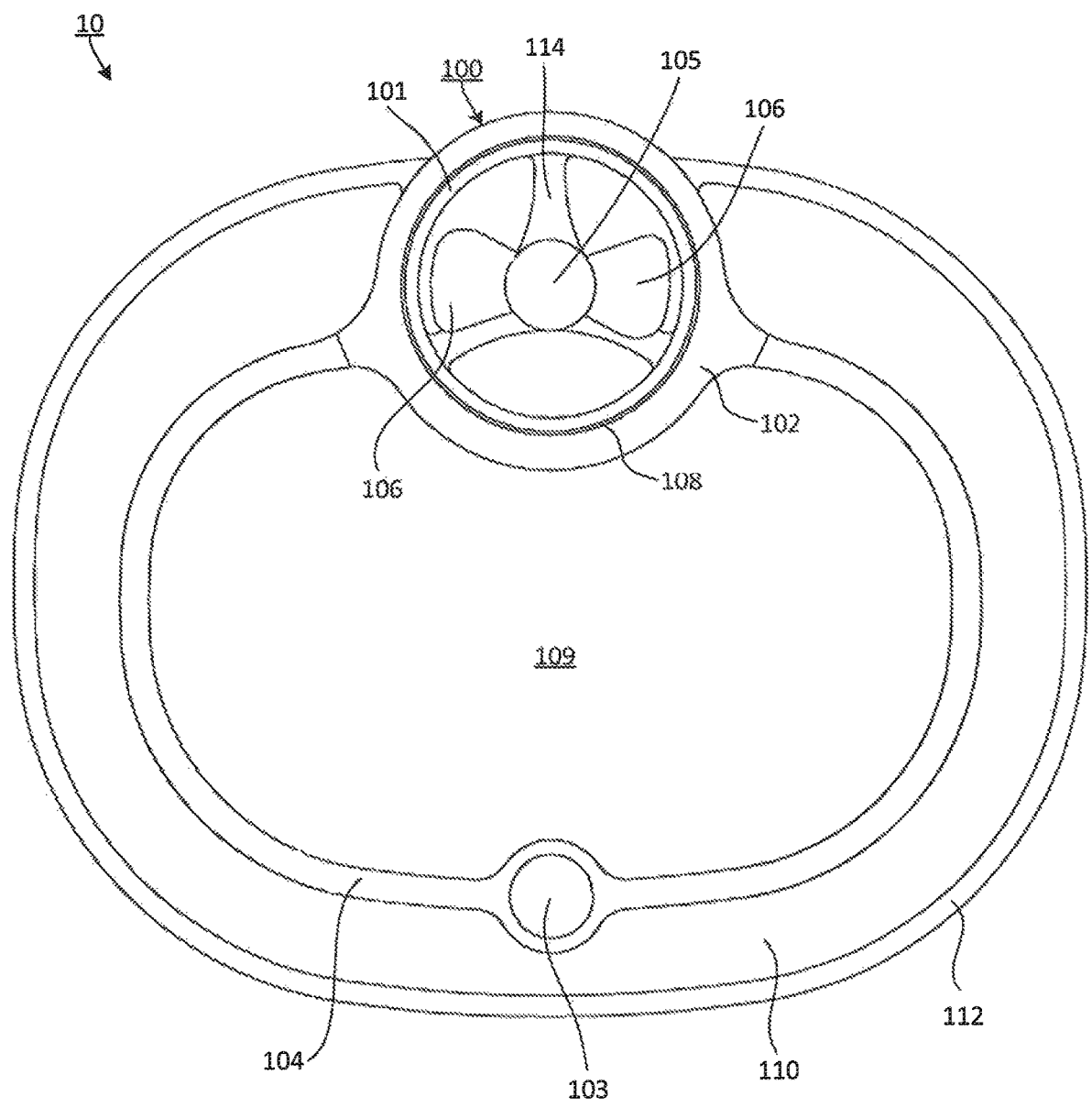
FIG. 1 is a front view of a mirror with integrated fan, according to an exemplary embodiment of the present subject disclosure.
Figure 5:
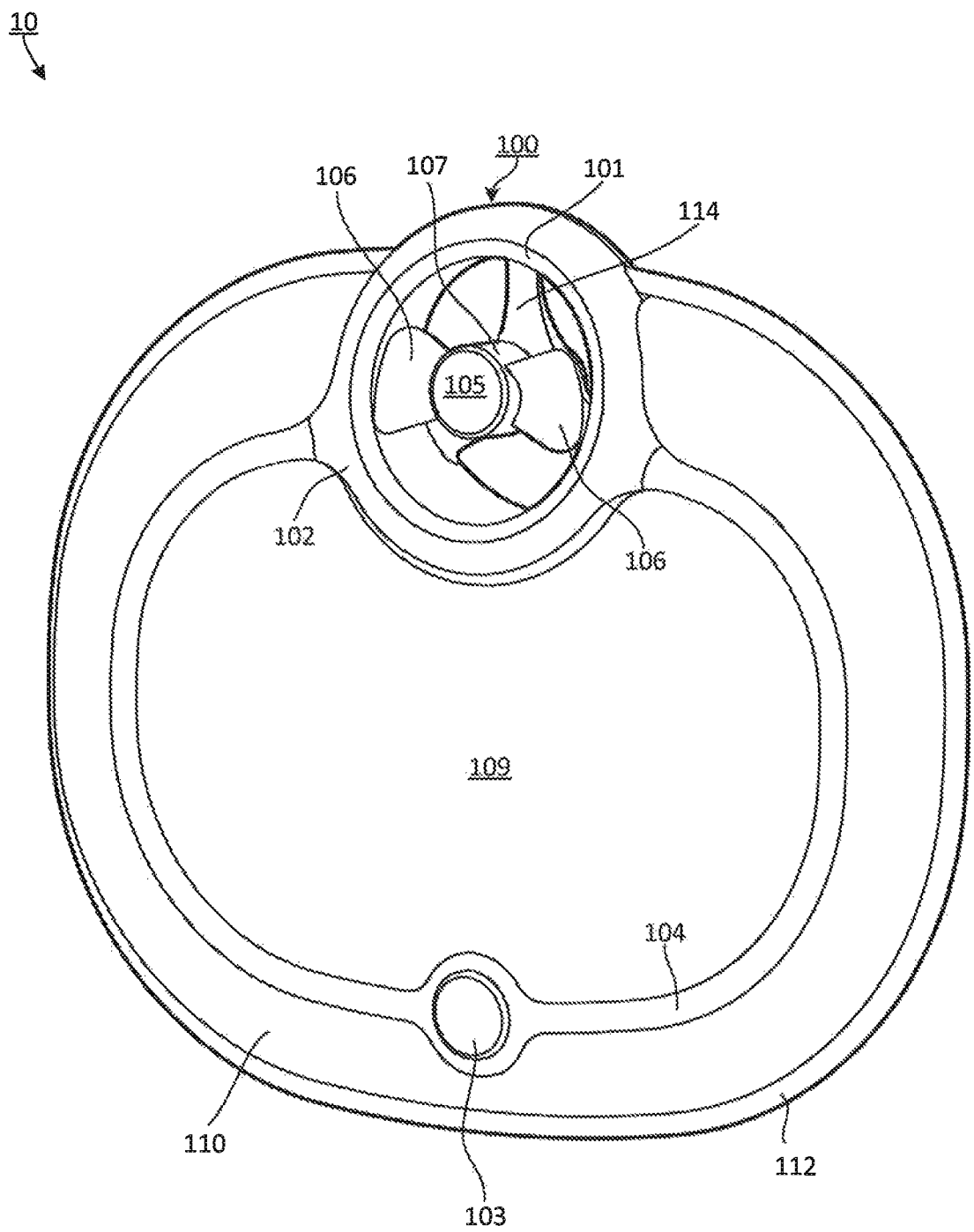
FIG. 5 is a perspective view of the mirror with integrated fan of FIG. 1.

FIGS. 1 and 5 illustrate, the mirror assembly including a mirror front housing 110 that encircles a mirror frame 104, which encircles a mirror 109. The mirror frame 104 secures a mirror 109 in a mirror front housing 110.

A button 103, which can be an off/on/fan speed button, controls the operation of the fan 100 within a fan middle housing 108. A person of ordinary skill in the art would understand that the fan may be capable of operating at a variety of different speeds. Although a button 103 is shown to be disposed directly in the mirror frame 104, the button 103 may be disposed in any other position in the fan mirror assembly 10. Furthermore, the button 103 may be a switch or any other similar structure that allows for controlling operation of the fan 100.

As further shown in FIG. 1, the fan mirror assembly 10 may further have a fan 100. The fan 100 may have fan rim 101 which rests upon a fan front housing 102 and secures to a fan middle housing 108, which is supported by a spoke housing or fan back housing 114. Within the fan middle housing 108 is a set of fan blades 106 which are positioned about a rotating shaft 107 (as shown more clearly in FIGS. 5, 7 and 8), held in place by a blade cap 105, and driven by a motor 113 (as most clearly shown in FIGS. 7 and 8). Although shown as separate units, the mirror frame 104 and the fan front housing 102 may be one integral unit.

The fan 100 may be positioned at an end of the mirror 109. As shown in FIG. 1, the fan 100 may also border the mirror 109 with mirror frame 104 in a manner to substantially encircle the mirror 109. The fan 100 may also be horizontally positioned near the center of the fan mirror assembly 10.

Figure 2:
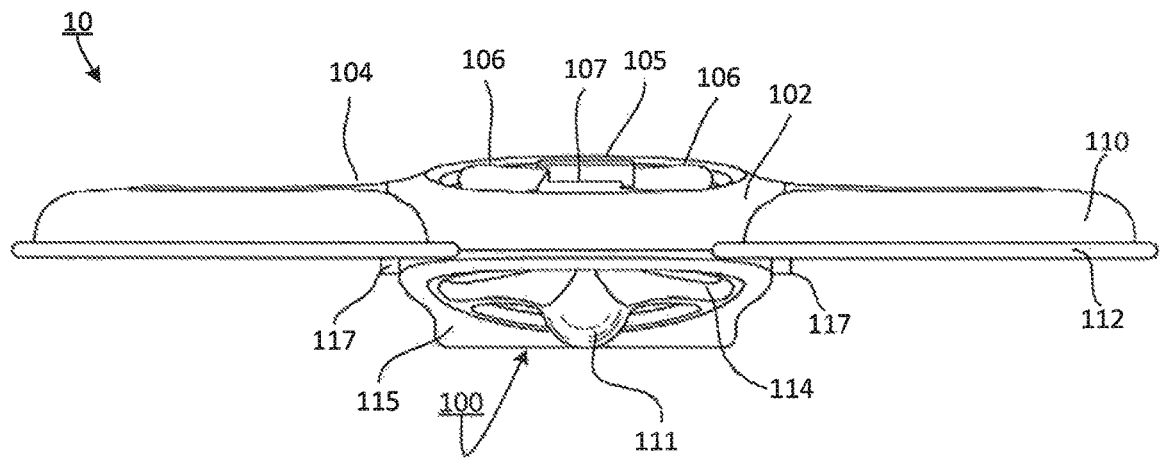
FIG. 2 is a top view of the mirror with integrated fan of FIG. 1.
Figure 3:
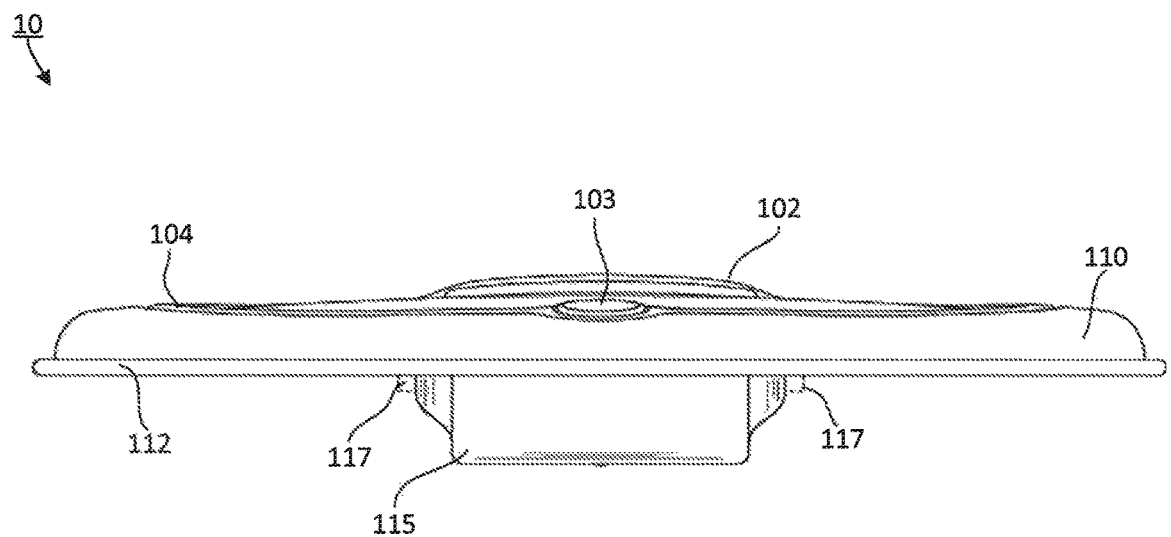
FIG. 3 is a bottom view of the mirror with integrated fan of FIG. 1.
Figure 4:
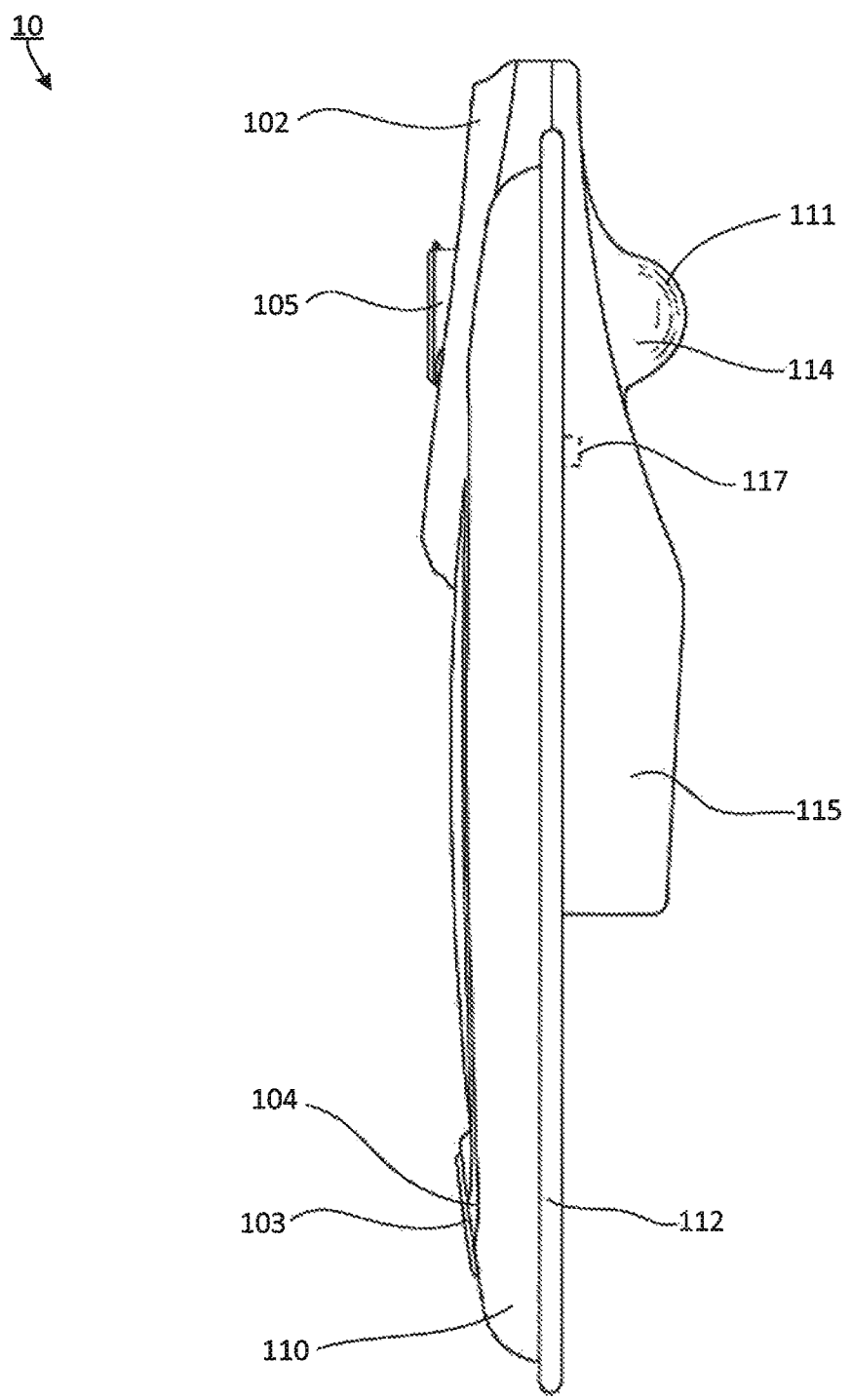
FIG. 4 is a side view of the mirror with integrated fan of FIG. 1.
Figure 8:
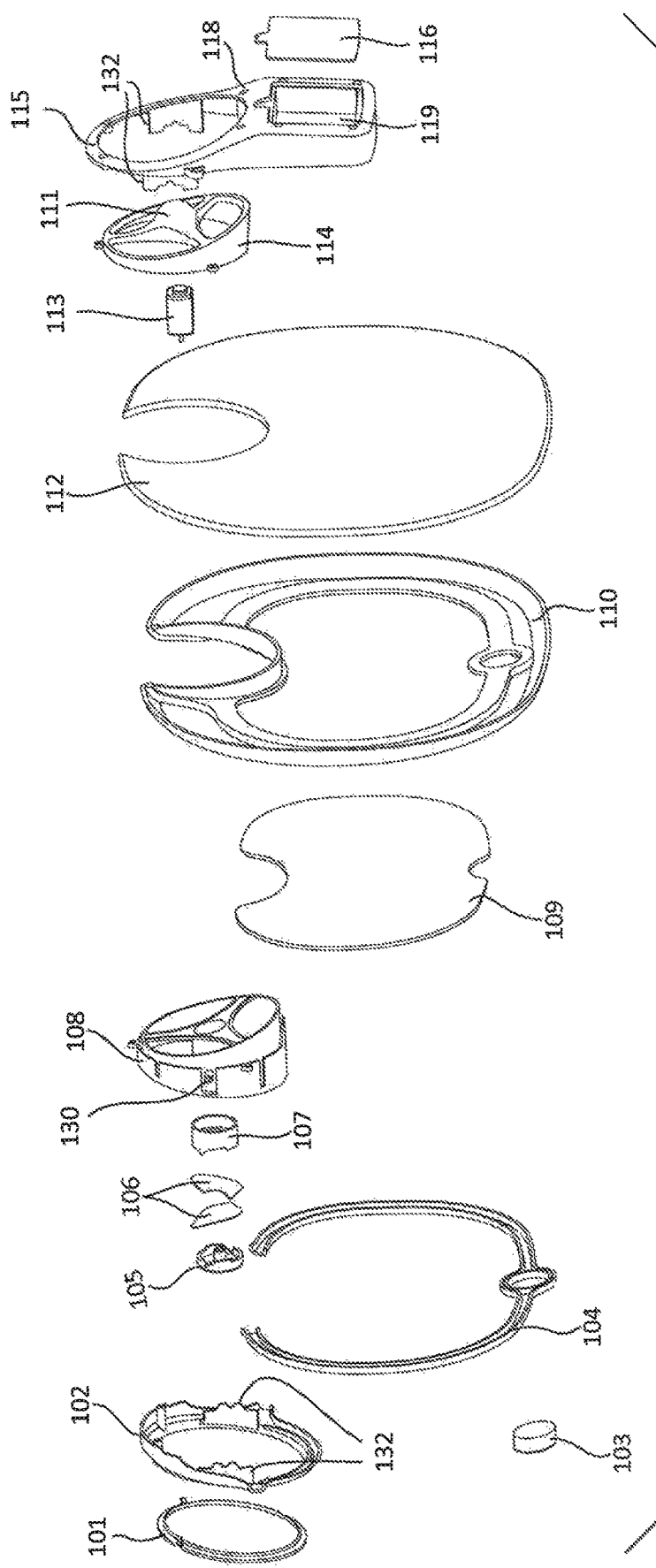
FIG. 8 is a back perspective exploded view of the mirror with integrated fan of FIG. 1.

FIGS. 2-4 show the fan front housing 102 and the fan back housing 114 connected together being of a wider width than the mirror front housing 110 and the mirror back housing 112 to compensate for the fan 100. However, it is to be understood that the widths of the fan front housing 102 and the fan back housing 114 may be of any widths to properly encase the fan 100. Furthermore, the mirror front housing 110 and the mirror back housing 112 may be of a wider width to create a seamless design. In other words, the fan front housing 102, the fan back housing 114, the mirror front housing 110 and mirror back housing 112 may all be of any varying widths to encase the mirror and the fan 100. Similarly, the fan back housing 114 may have a bulbous center point 111 to allow the motor 113 (as shown in FIG. 8) to fit inside. Again, it is to be understood that the depth of fan back housing 114 may be of any depth to allow for proper encasing of the fan 100.

The fan front housing 102 and the fan back housing 114 may be constructed of a variety of different materials, including but not limited to foam, rigid material, fabric, steel, finished wood, cardboard and the like. It is to be understood that the fan front housing 102 and the fan back housing 114 need not be constructed of the same materials. Furthermore, the fan front housing 102 and the fan back housing 114 may be similarly held together by a variety of materials, including but not limited to stitches, wires, plastic, glue, screws, buckles and the like.

Figure 6:
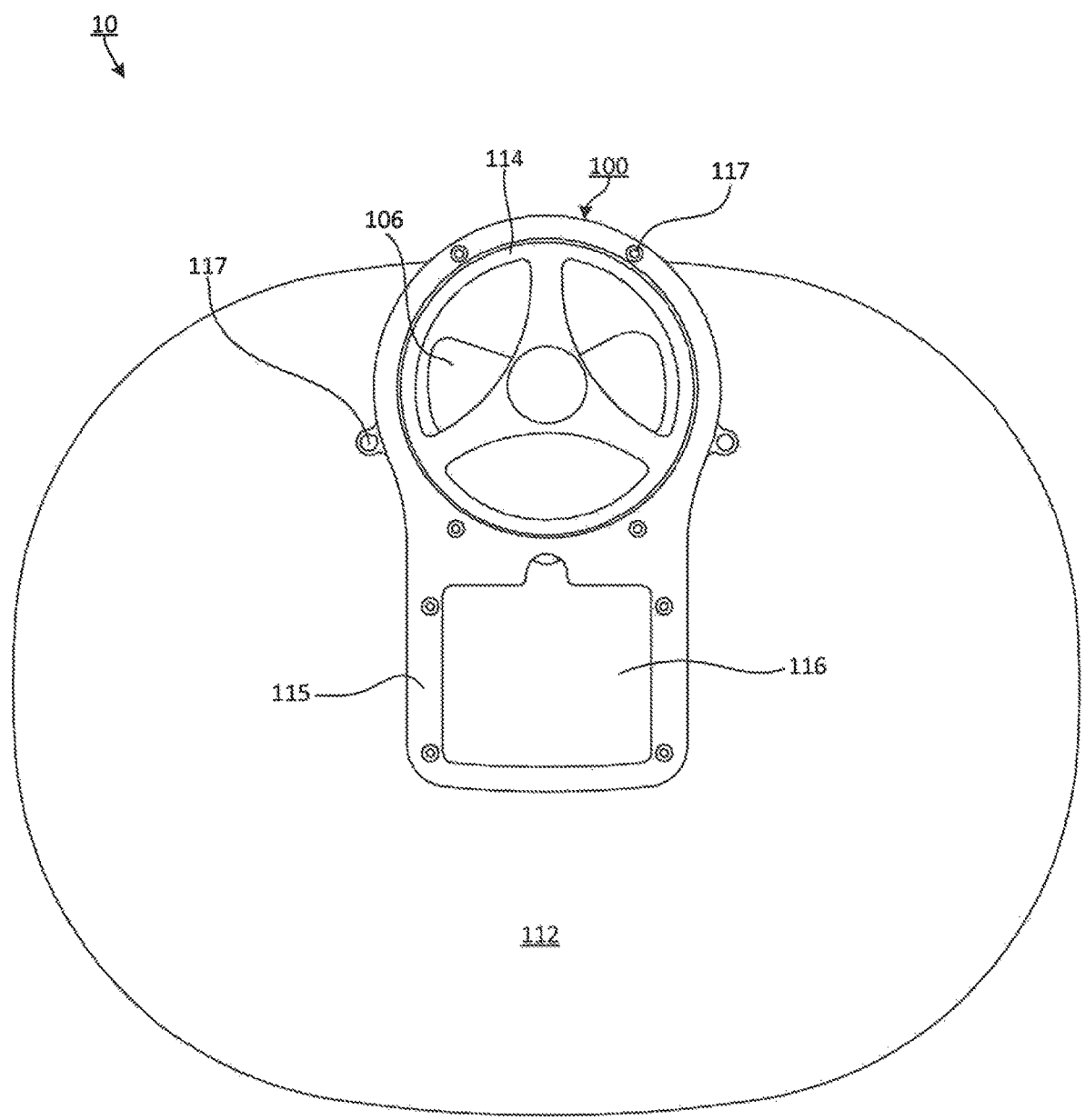
FIG. 6 is a back view of the mirror with integrated fan of FIG. 1.

FIG. 6 depicts the back of the fan mirror assembly 10 having a mirror back housing 112, which provides back support to the mirror 109. A back housing 115 disposed on the mirror back housing 112 serves to secure the fan back housing 114 and the mirror rear housing 112 together. Although shown using screws 117, the back housing 115 may be attached to the mirror back housing 112 through any conventional methods, including but not limited to screws, glue, co-molding and other methods.

A battery housing 119 may be integrated into the back housing 115. On the back housing 115 may be a battery door 116, which is opened to insert or replace batteries which power the operation of the fan 100, secures batteries within a battery compartment in the back housing 115. The power supplied may be provided from various sources, such as solar, a wired plug, etc.

Figure 7:
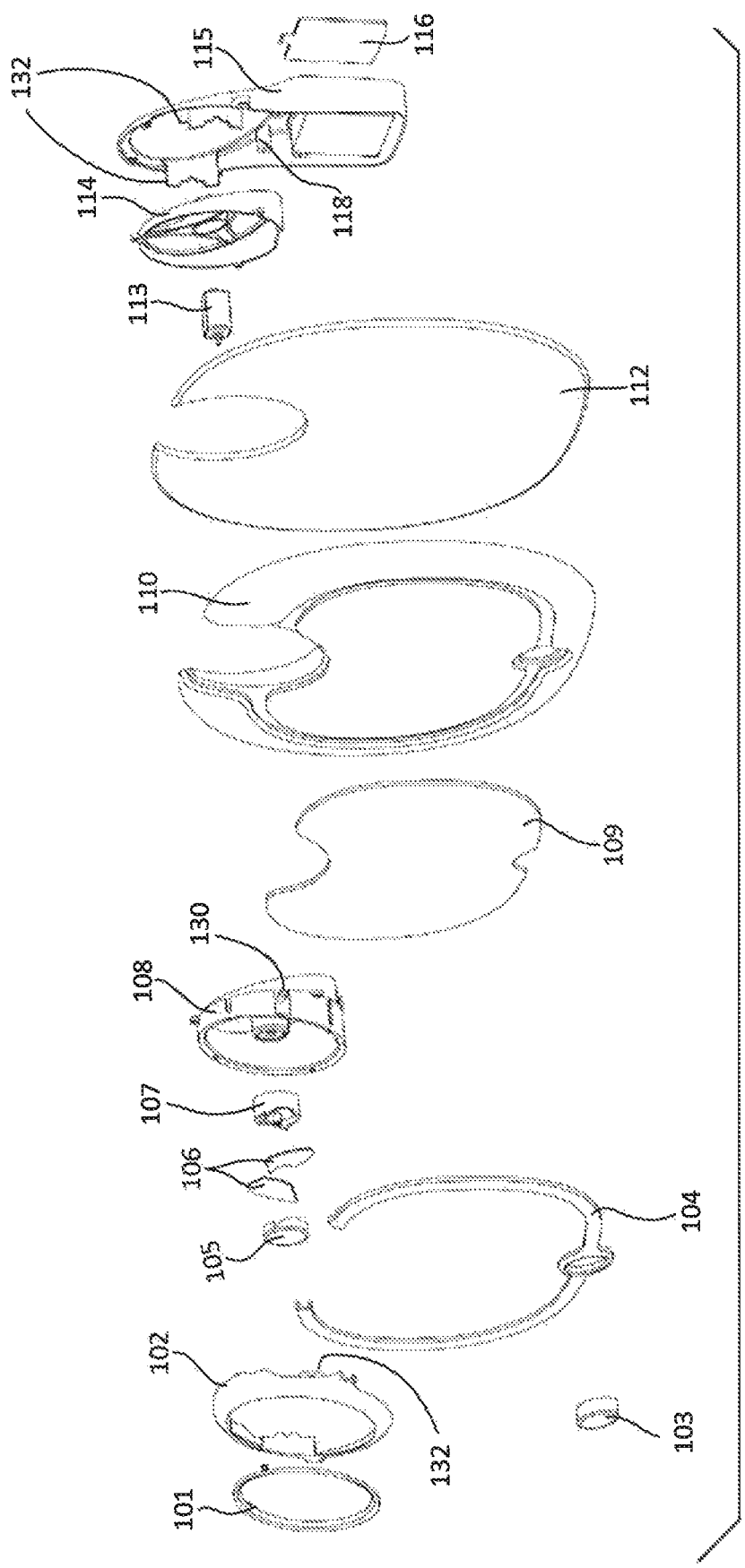
FIG. 7 is a front perspective exploded view of the mirror with integrated fan of FIG. 1.

FIGS. 7 and 8 illustrates that the fan 100 may have a fan rim 101, which is designed to fit inside fan front housing 102. Fan front housing 102 is adjacent to mirror frame 104, which has button 103 disposed therein and secures the mirror 109 against the mirror front housing 110 that is attached to the mirror back housing 112. Fan front housing 102 also holds down fan middle housing 108.

A rotating shaft 107 lies between fan front housing 102 and fan middle housing 108. The rotating shaft 107 may have the fan blades 106 disposed thereon and is covered by the blade cap 105. The rotating shaft 107 is driven by the motor 113, which may be disposed between the fan middle housing 108 and fan back housing 114. The fan back housing 114 is secured in place by back housing 115.

Back housing 115 may have apertures disposed therein for screws, bolts, rivets or the like 117 to secure the back housing 115 to the mirror back housing 112. The fan back housing 114 may similarly have apertures that may align with apertures on back housing 115 to further secure the fan back housing 114 within the back housing 115. The fan back housing 114 may also have a battery door 116 to secure batteries within the battery housing 119 that may be defined within the back housing 115.

FIGS. 7 and 8 depict a protrusion 130 provided in the fan middle housing 108, which may be disposed between alignment ridges 132 of the fan front housing 102 and the fan back housing 114. The protrusion 130 may be substantially cylindrical in shape, which allows the fan middle housing 108 to pivot, move and/or tilt in relation to the housing and thereby adjust the direction of the airflow. Although not shown, another embodiment may be designed to incorporate a gimbal-like movement so that the fan 100 can tilt freely in any direction. In one example, another similar protrusion that may be provided to create a ball and socket joint with a mating cavity in another embodiment of the back housing 115. For example, the second embodiment of the back housing 115 may have a similar center as the center in the fan back housing 114. This would allow for further movement and/or adjustment of the fan 100 to control the direction of the airflow. Similarly, the bulbous center point 111 of the fan back housing 114 may act as the protrusion to fit inside the mating cavity in the other embodiment of the back housing.

Figure 9:
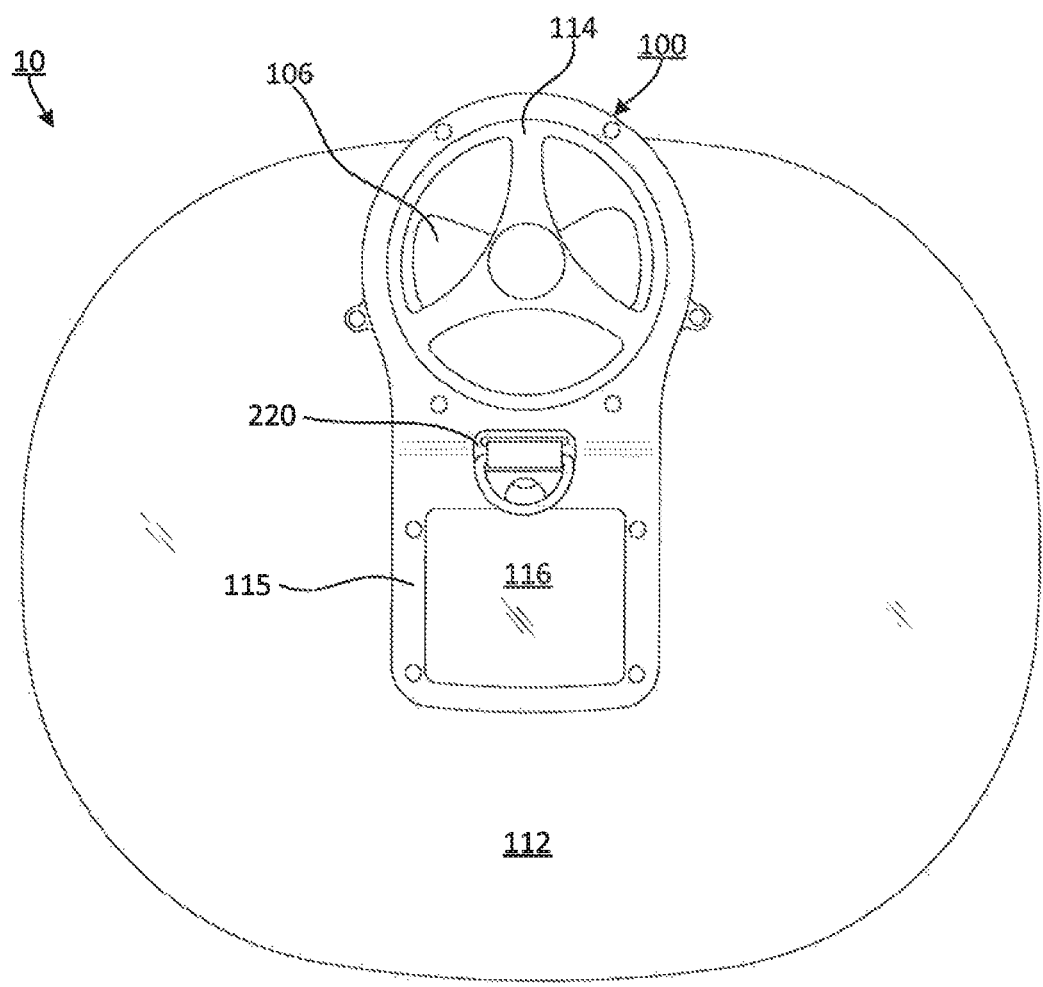
FIG. 9 is a back view of a second embodiment of a mirror with integrated fan.

In FIG. 9, the fan mirror assembly 10 may also have a complementary mating feature 220, in this embodiment a ring 220, disposed on the back housing 115. The ring 220 may be used in conjunction with a hook or strap to hold the fan mirror assembly 10. The fan mirror assembly 10 may be secured via the ring 220 to various locations such as within a vehicle 190 to a headrest 210, a car seat, etc.

Figure 10:
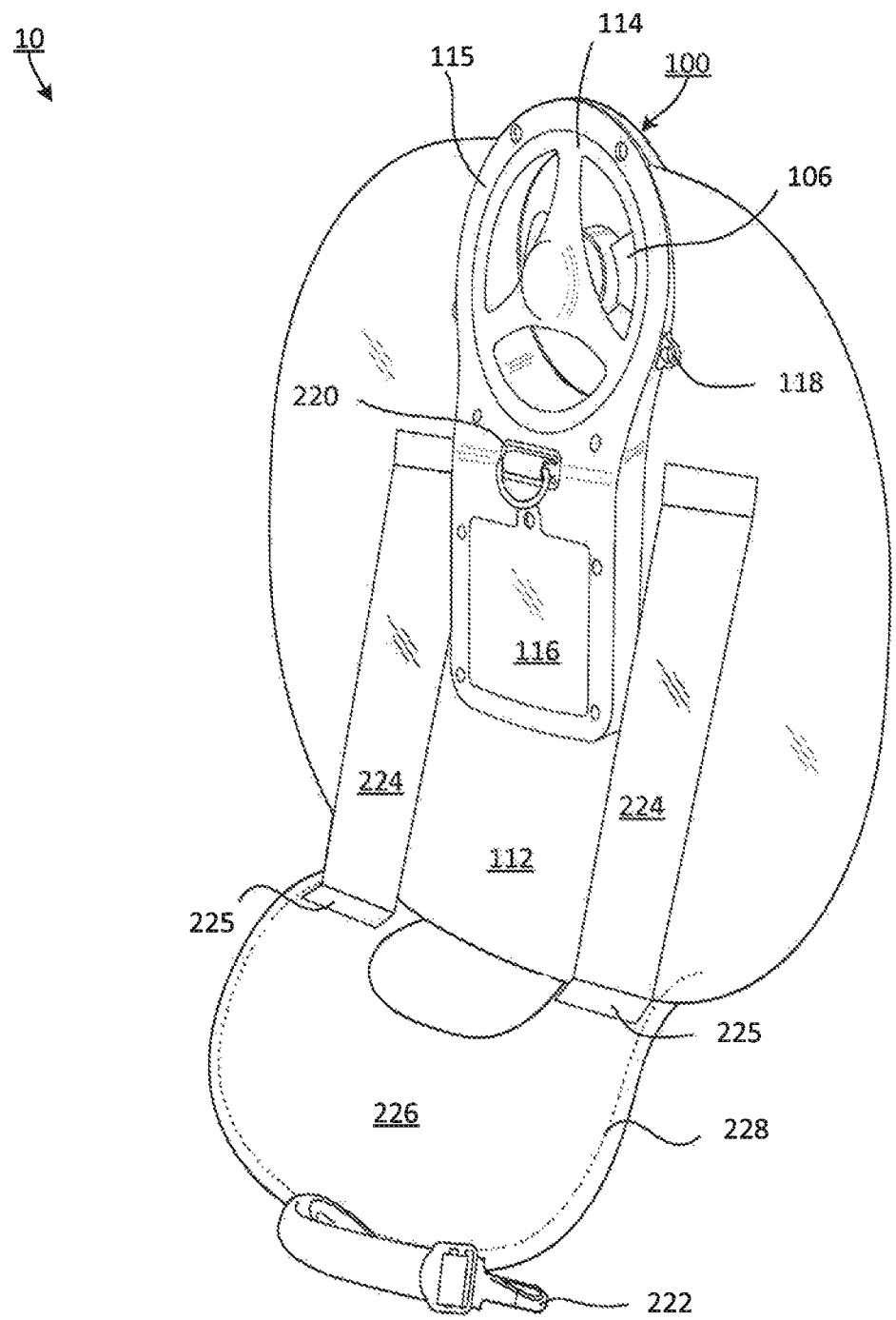
FIG. 10 is a back view of a third embodiment of a mirror with integrated fan.

FIG. 10 shows the fan mirror assembly 10 may also have straps 224 that may be removably or permanently attached to the fan mirror assembly 10. Although showed attached to the mirror back housing 112, it is to be understood that the straps 224 can be attached to any portion of the fan mirror assembly 10. As shown, the straps 224 extend out from the mirror back housing 112. Although FIG. 10 shows the straps 224 being removably attached to a flap 226 that protrudes from the fan mirror assembly 10 via a securing mechanism or securing element 225, such as Velcro pads, the straps may also be permanently attached to the flap 226. It is to be understood that the straps 224 and the flap 226 may be disposed on and protrude from the fan mirror assembly 10 in any location that provides support in more than one direction.

The flap 226 may also have an adjustable leash or a secondary securing mechanism 222. This secondary securing mechanism 222 may be capable of fastening to the complementary mating feature 220, in this embodiment the ring 220, creating a circle that may envelope and be secured to an object, such as a headrest 210 of a car seat.

A wire 228, or other rigid element, may be disposed within the flap 226. This wire may provide further support to the flap 226 to provide enhanced rigidity to the flap 226. The wire 228 may be made of any resilient material, such as thin steel, copper, plastic and the like. Due to its resiliency, the wire 228 may be molded or manipulated by a user to form different geometric shapes. For example, a user may bend the wire at two points in the same general direction to allow the flap 226 to become a base for the mirror assembly 10 to lean against.

It is further contemplated that the fan mirror assembly 10 may be outfitted with a set of louvers (not shown) which are positioned in front of and cover the fan blades 106 and direct air flow in a desired direction. The louvers may be positioned within the fan front housing 102.

In operation, the fan mirror assembly 10 may be attached to various locations, including, for example, the back side of a headrest of an automobile. The mirror 109 may be used by parents or drivers to maintain a constant visual contact with an infant or toddler 198 strapped into car seats which are facing the front or rear of the vehicle 190. The parent or driver can position the fan mirror assembly 10 so that there is a reflected line of sight between the parent and an automobile's rear-view mirror 203, and the fan mirror assembly 10, which shows the face of the infant 198.

Further, the fan mirror assembly 10 is used to cool off the infant 198 by operating the fan to direct air over the face or body of the infant or toddler 198. The fan 100 operation may be controlled through button 103, and/or remote control by the parent using a standard remote control.

In use, the fan mirror assembly 10 may be used and attached as described in U.S. Pat. No. 7,097,314, which is incorporated by reference herein in its entirety into this disclosure. The connecting technique and straps described in the incorporated patent may also be implemented in the present subject disclosure.

The fan mirror assembly 10 is not limited to use for infants or toddlers 198 but may also be used by drivers or passengers of automobiles to allow air flow to be directed toward the driver or simply just to allow circulation to occur. This is particularly helpful for drivers who are on road trips or particularly tired or sleepy. The increased air flow by the use of the fan 100 on the fan mirror assembly 10 serve to keep the driver alert during the drive by providing fresh oxygen to the face of the driver. The mirror assembly is particularly useful for professional drivers, such as truckers, taxi drivers, police officers, and the like.

Figure 11:
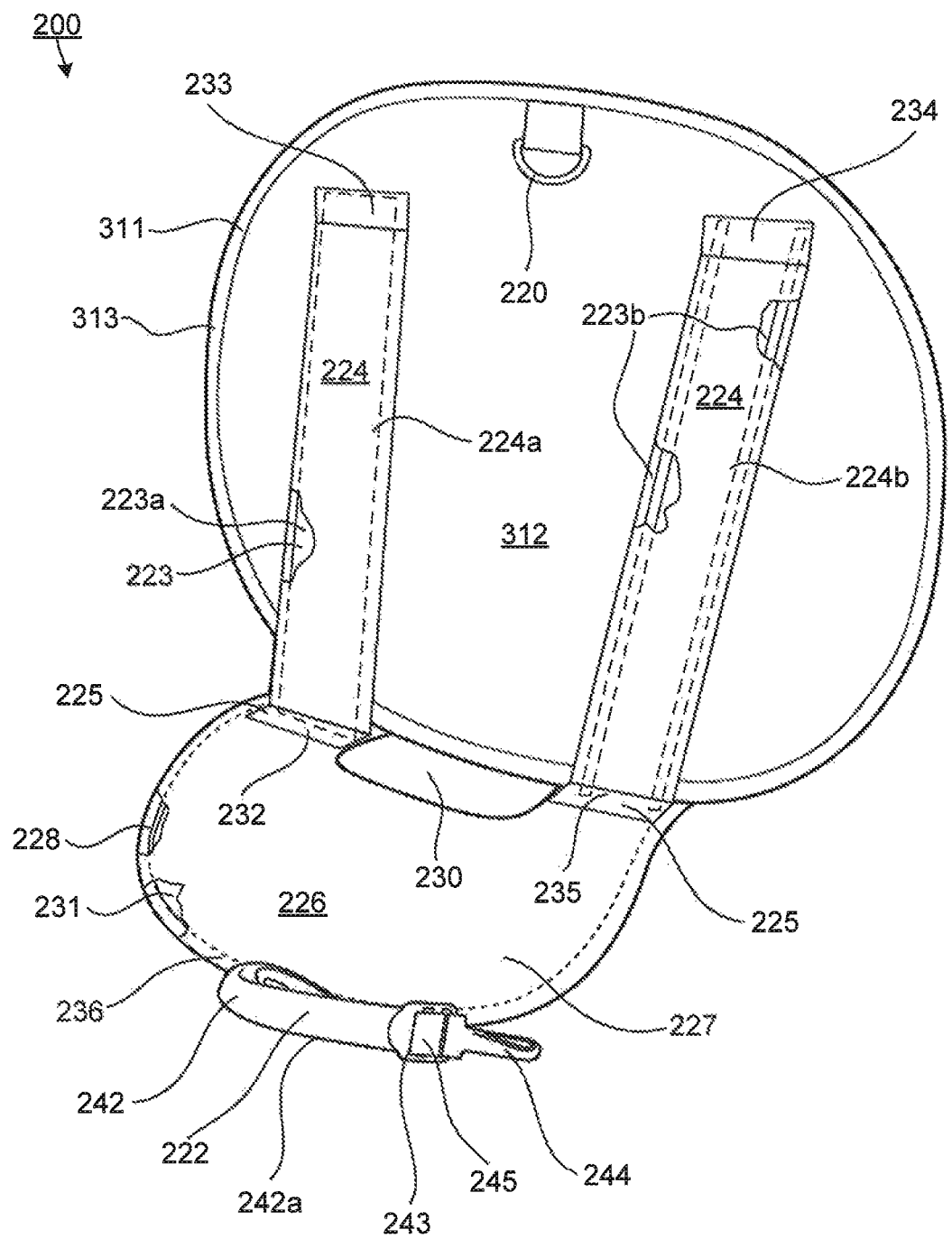
FIG. 11 is a back view of a vehicle seat mounting assembly.
Figure 12:
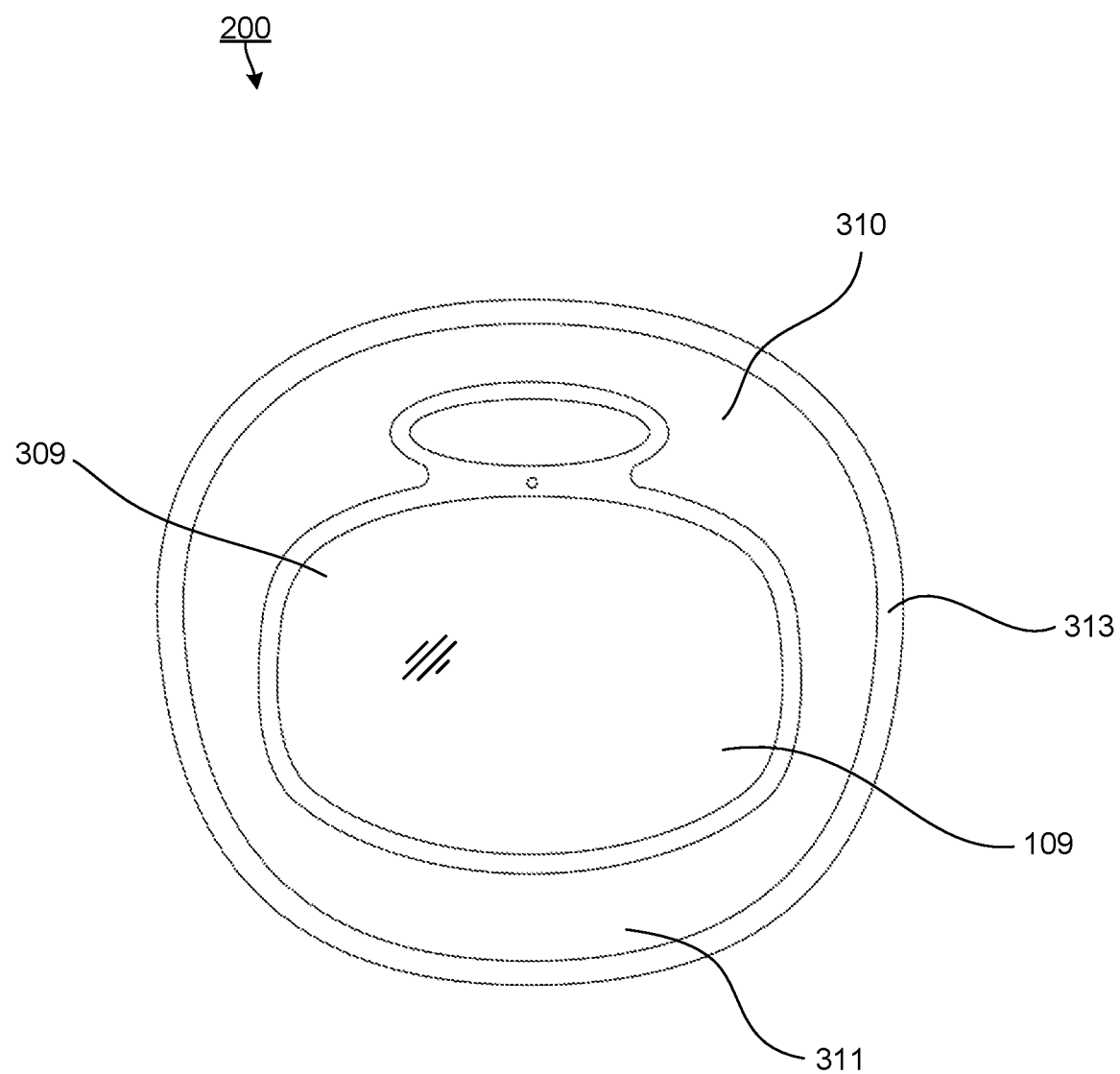
FIG. 12 is a front view of a front housing and a panel in the mounting assembly.

As shown in FIGS. 11-12, a mounting assembly 200 may be disposed without a fan 100. In this embodiment, a panel 309 may be disposed in a housing 311. The panel 309 may include a mirror 109, a fan 100, a display or any suitable item according to this subject disclosure. The panel 309 may also include a clear screen, an LCD screen, LED screen, E-Ink display, or a composite display incorporating any or all of the previously mentioned screens. The composite display may be a touchscreen including a capacitive or resistive touch sensor pad. The panel 309 may include a mechanical display, keyboard, speaker or air-freshener. The panel 309 may be configured to hold a tablet, smartphone, book, e-reader, artwork, game or toy. The panel 309 may incorporate any of the previously listed features alone or in combination.

As shown in FIGS. 11-12, the housing 311 may further have a front housing 310 and a back housing 312. The housing 311 may have the straps 224 attached therein. The straps may be attached to the front housing 310 or the back housing 312. The straps 224 may include a first strap 224a and a second strap 224b. In this embodiment there are two straps 224, but additional straps may be provided with the mounting assembly 200. It is further contemplated that the mounting assembly 200 may have a single strap or no straps. The straps 224 may be formed from plastic, thermoplastic polymers, fabric, woven fabric, cardboard, or the like. The straps 224 may have a rigid element 223 to provide additional rigidity to the straps 224 in order to support the weight of the mounting assembly 200. As shown in FIG. 11, the rigid element 223 may be disposed on the surface of the straps 224 or inside the straps 224. The rigid element 223 may be a strap insert 223a that is resilient or a wire 223b that is resilient and deformable to provide support for the mounting assembly 200.

As shown in FIG. 11 the first strap 224a may have a first strap attachment point 233 and the second strap 224b may have a second strap attachment point 234. The strap attachment points 233, 234 may be attached to the housing 311. The strap attachment points 233, 234 may be disposed on the front housing 310 or the back housing 312 as shown in FIG. 11. Alternatively, the attachment points 233, 234 may be disposed anywhere on a housing perimeter 313 that borders the mounting assembly 200. The strap attachment points 233, 234 may be permanently or removably affixed to the housing 311. Possible attachment means include hook and loop, adhesive, snap-fit, button, zipper, buckles, magnet, and the like.

The straps 224 may have the securing element 225 on the straps 224 in order to connect to the flap 226. The first strap 224a may have a first strap securing element 232 and the second strap 224b may have second strap securing element 235. The strap securing elements 232, 235 may be disposed anywhere on the straps 224. The strap securing elements 232, 235 may be removable or permanently fixed to the flap 226.

Figure 13:
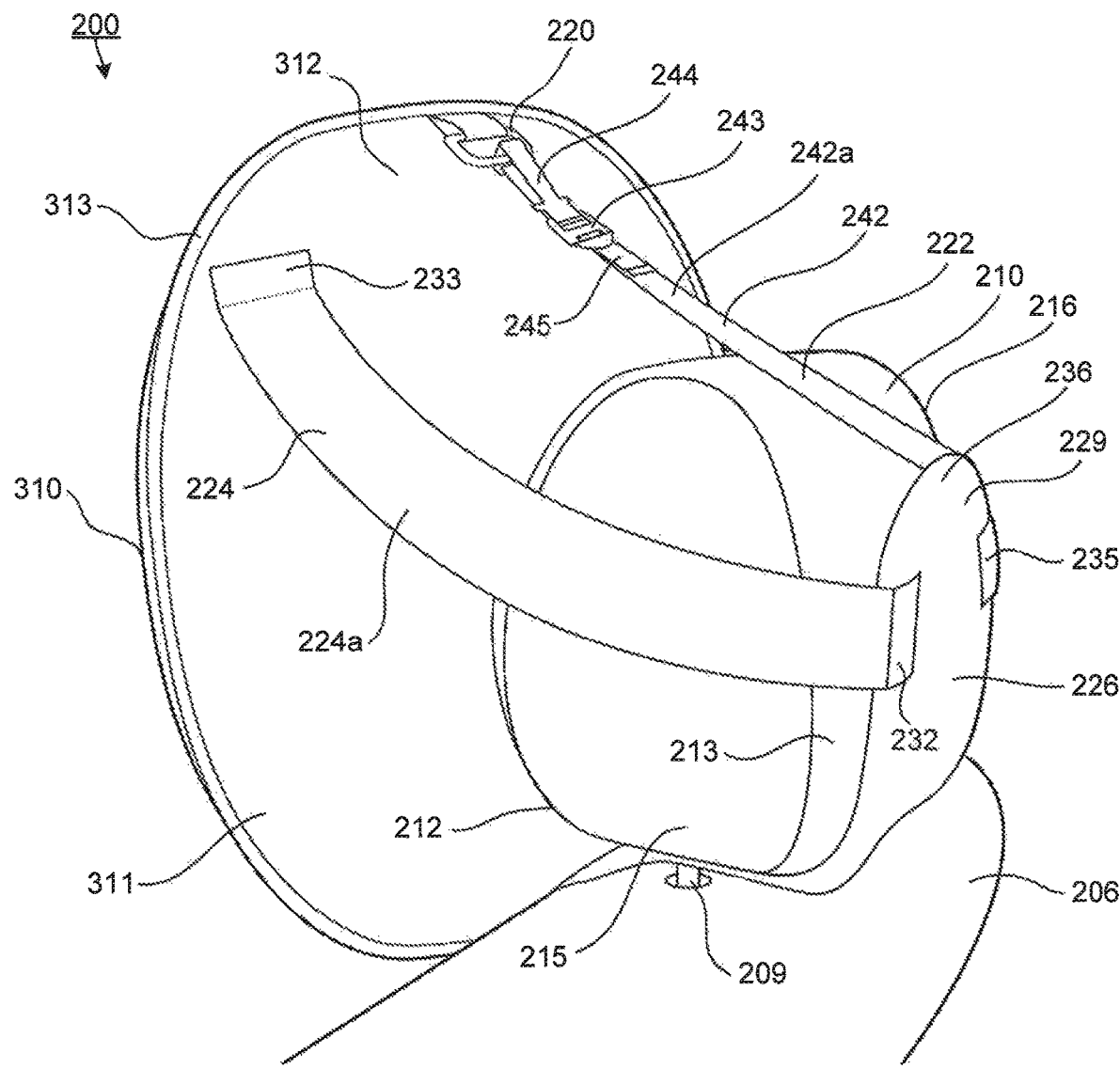
FIG. 13 is a rear perspective of the mounting assembly attached to a headrest of a rear seat in a vehicle.
Figure 16:
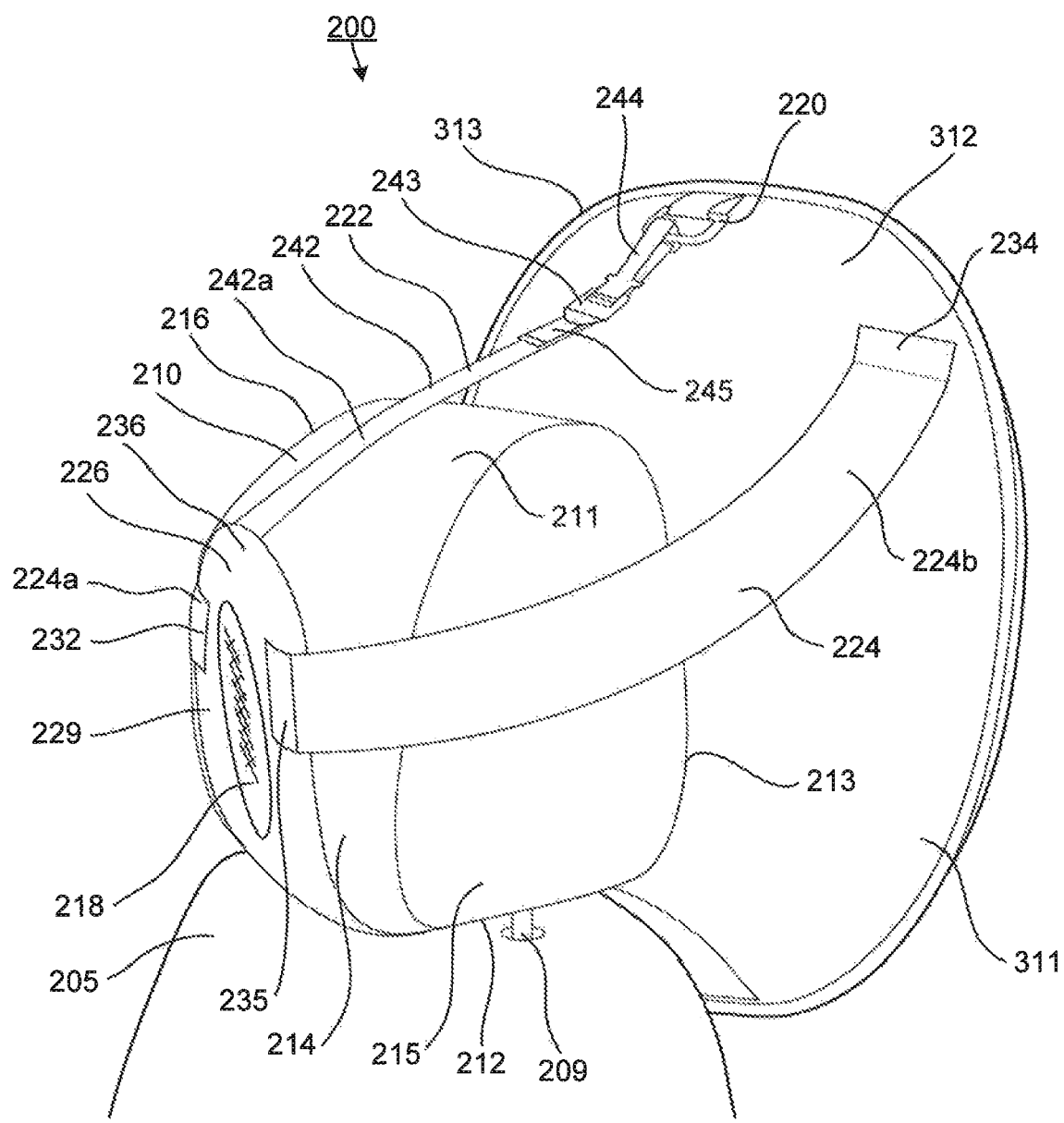
FIG. 16 is a rear perspective of the mounting assembly attached to a headrest of a front seat in the vehicle.
Figure 21:
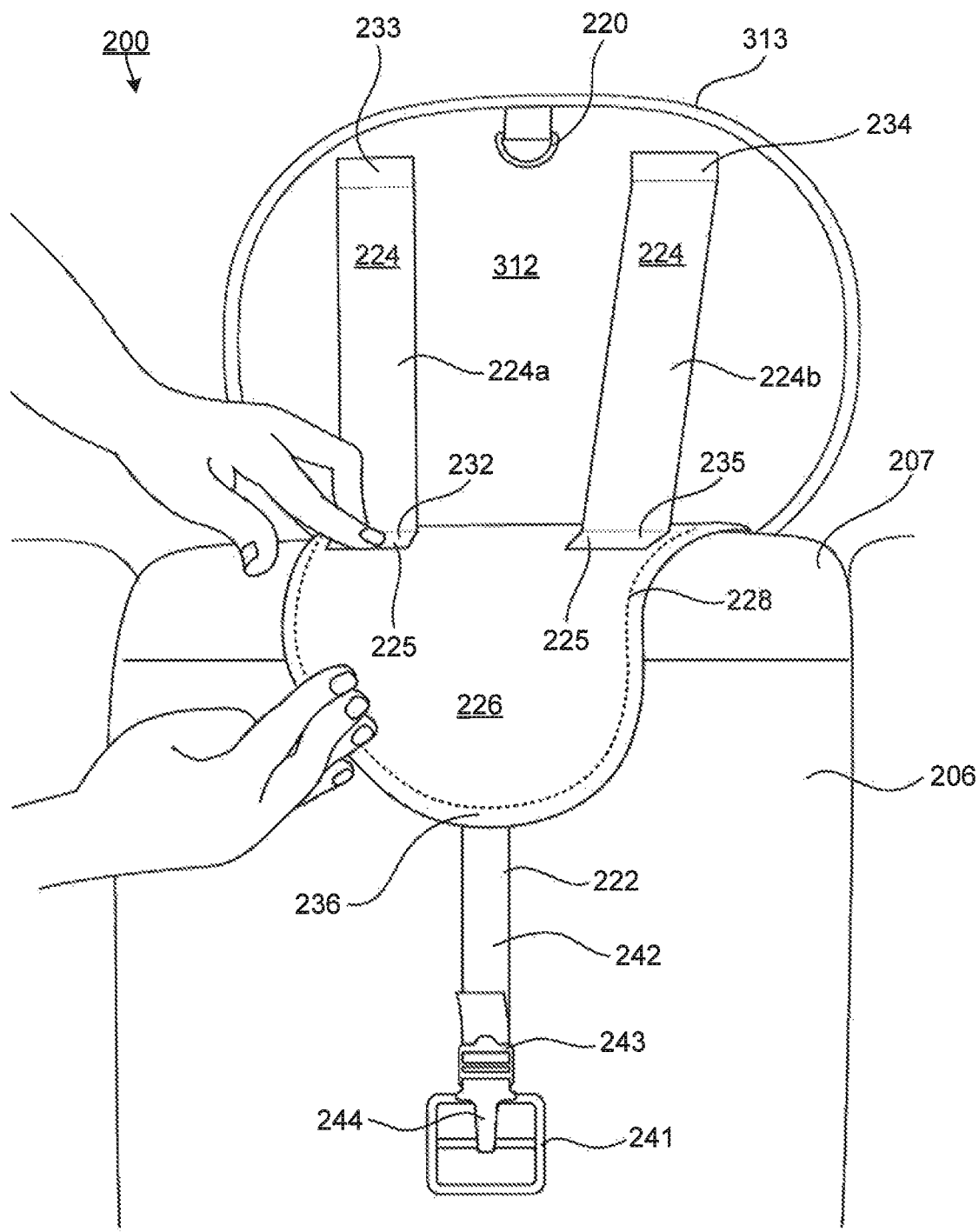
FIG. 21 is a rear view of the mounting assembly attached to a top surface of the rear seat and an anchor point disposed on the rear seat.
Figure 22:
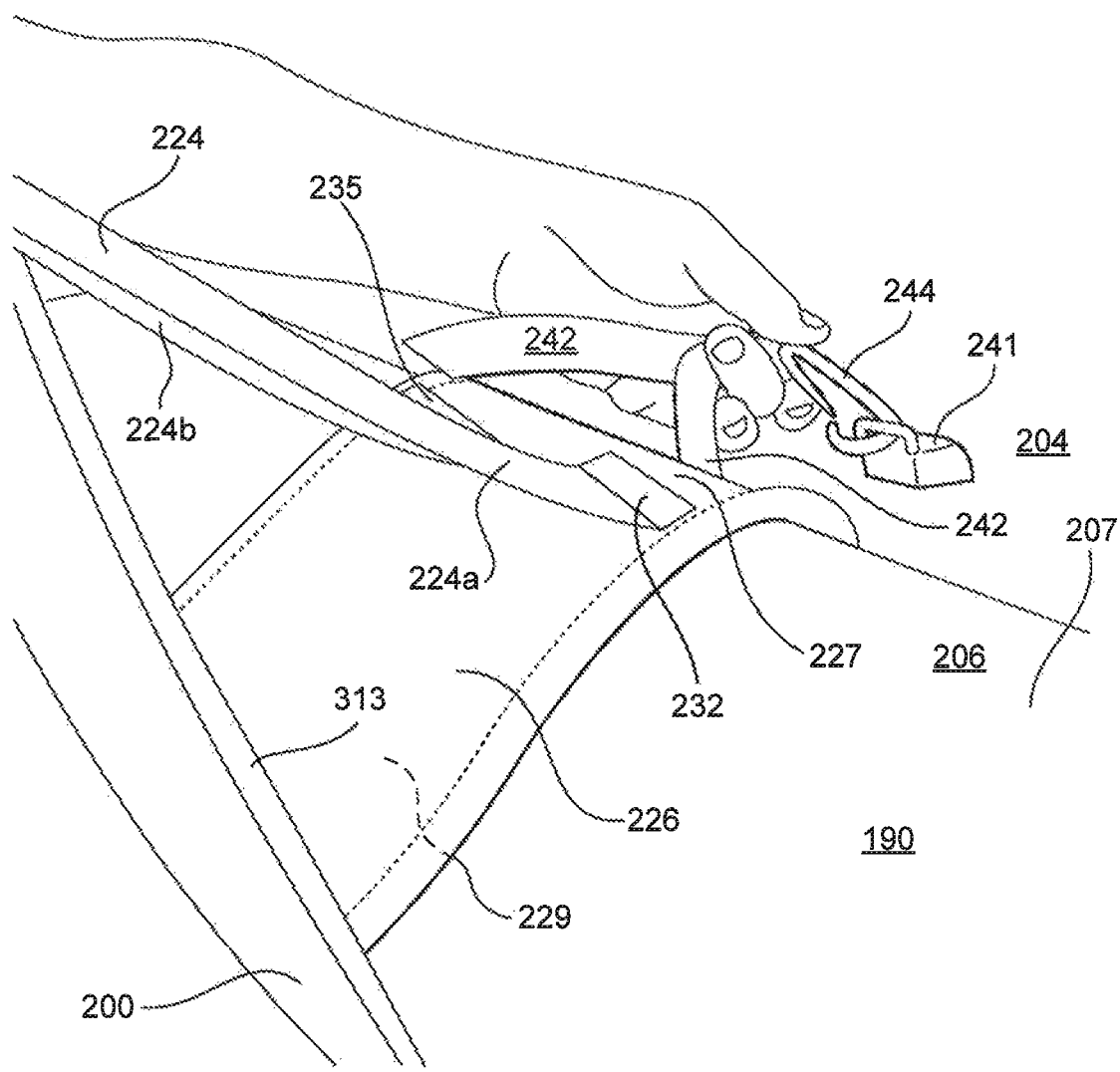
FIG. 22 is a side perspective of the mounting assembly attached to the top surface of the rear seat and an anchor point disposed on a rear shelf of the vehicle.

As shown in FIGS. 11, 13 and 16, the flap 226 has a top surface 227 and a bottom surface 229. The flap 226 may be attached anywhere on the housing 311. The bottom surface 229 of the flap 226 may be comprised of an anti-skid fabric 218, such as rubberized fabric, stitched fabric, silicone, crosshatched material, ridged material, and the like, to enhance contact and friction with a rear seat top surface 207 (FIG. 21-22). Alternatively, the top surface 227 of the flap 226 may be similarly disposed with an anti-skid fabric 218 to enhance friction and contact between the flap 226 and a headrest bottom surface 212.

The flap 226 may be formed of a single, solid piece of material or may be disposed with at least one flap aperture 230. The flap aperture 230 may allow for a set of headrest posts 209 to fit inside the flap aperture 230. Alternatively, the flap 226 may be comprised of at least two separable portions that attachably form the flap 226 (not shown). That is, for example, a left flap portion may be detachable from a right flap portion to assist with the installation of the mounting assembly 200 on a headrest 210 of a front seat 205 or a rear seat 206. The left flap portion can wrap around one side of the headrest posts 209, while the right flap portion wraps around the opposite side of the headrest posts 209. The left flap portion can then be reattached to the right flap portion without having to remove the headrest 209 from the front seat 205 or rear seat 206.

As shown in FIGS. 11, 13-17 and 21-22, the strap securing elements 232, 235 of the straps 224 may attach to the top surface 227 or the bottom surface 229 of the flap 226 depending on the use position of the mounting assembly 200. In addition, a wire 228 may be disposed within the flap 226 to provide rigidity. It is contemplated that a larger portion of the interior surface area of the flap 226 may be disposed with a flap insert 231 to provide rigidity and structure for the flap 226 (FIG. 22). The flap insert 231 may be disposed as a mesh, strips of various length and width or a single flap insert 231 that encompasses the entire surface area of the flap 226. The wire 228 or flap insert 231 may be formed of a malleable, resilient material that enables a user to bend the flap 226 into a variety of positions or geometric shapes to match the contours of the headrest 210. The wire 228 or flap insert 231 comprised of a resilient material also enables a user to position the flap 226 as a base for the mounting assembly 200 to lean against.

Figure 23:
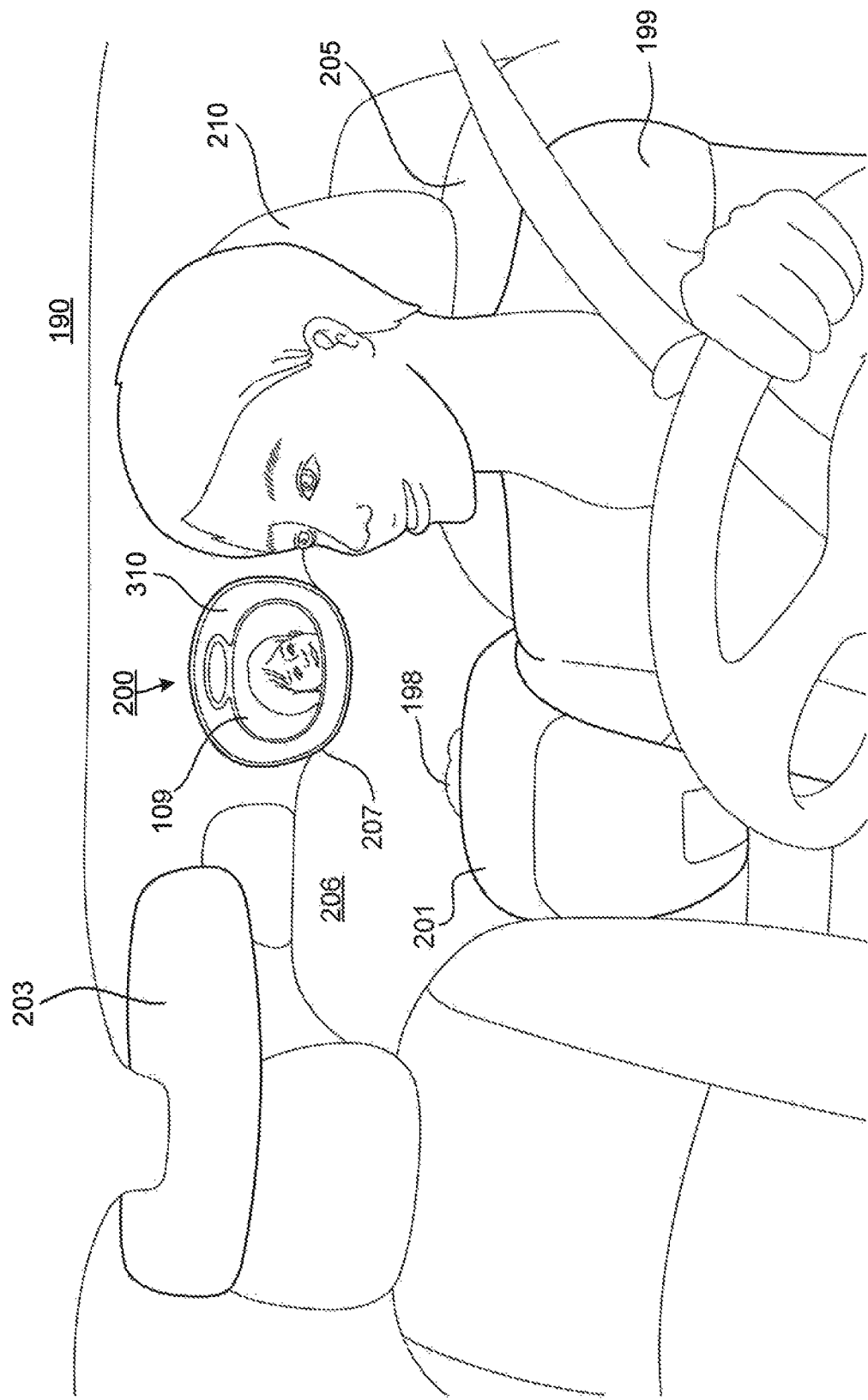
FIG. 23 is a front perspective looking inside the vehicle cabin showing a driver's line-of-sight between the rear-view mirror and the mirror of the mounting assembly installed on the rear seat in order to see the child secured in the rear-facing child safety seat.

The secondary securing mechanism 222 of the flap 226 is employed in the "headrest attachment" configuration shown in FIGS. 13-17 and in the "tether attachment" configuration shown in FIGS. 21-23. In the embodiment shown in FIG. 13, the secondary securing mechanism 222 is disposed as a tether strap 242 attached at a flap distal end 236 that is matingly attachable to the complementary mating feature or ring 220 disposed on the upper portion of the housing 311. Alternatively, the ring 220 may be disposed on the front housing 310 or housing perimeter 313. The tether strap 242 has a leash 242a that is adjustable in length, a buckle 243 that is adjustable and a fastener 244 in the form of a J-hook at its free or distal end portion 245. Alternatively, the secondary securing mechanism 222 may be a hook and loop strap, adjustable chain, zipper, elastic cord, elastic mesh, braided rope, resilient material, or the like.

Figure 14:
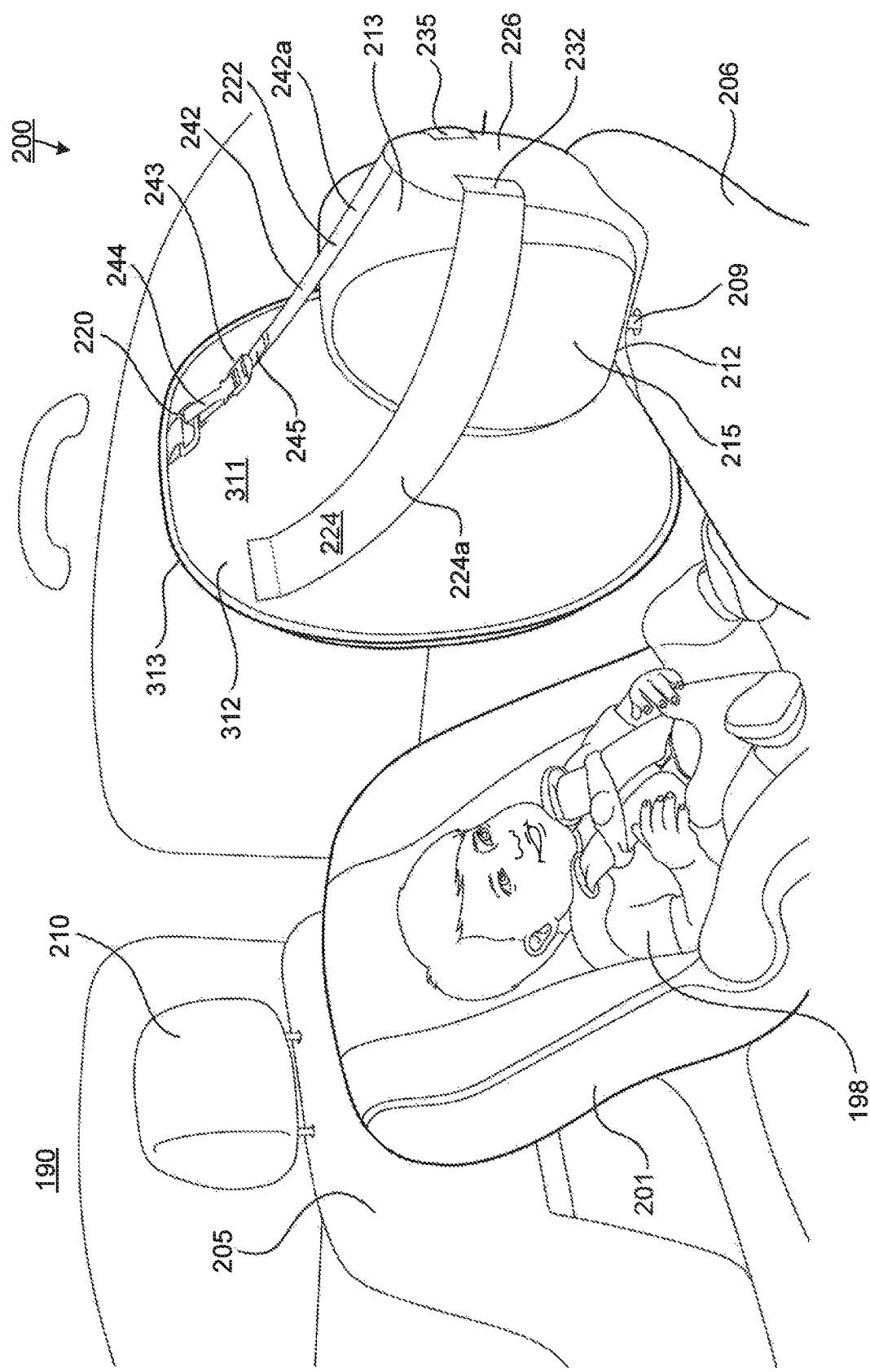
FIG. 14 is a rear perspective of the mounting assembly with the front panel facing a child secured in a rear-facing child safety seat.
Figure 15:
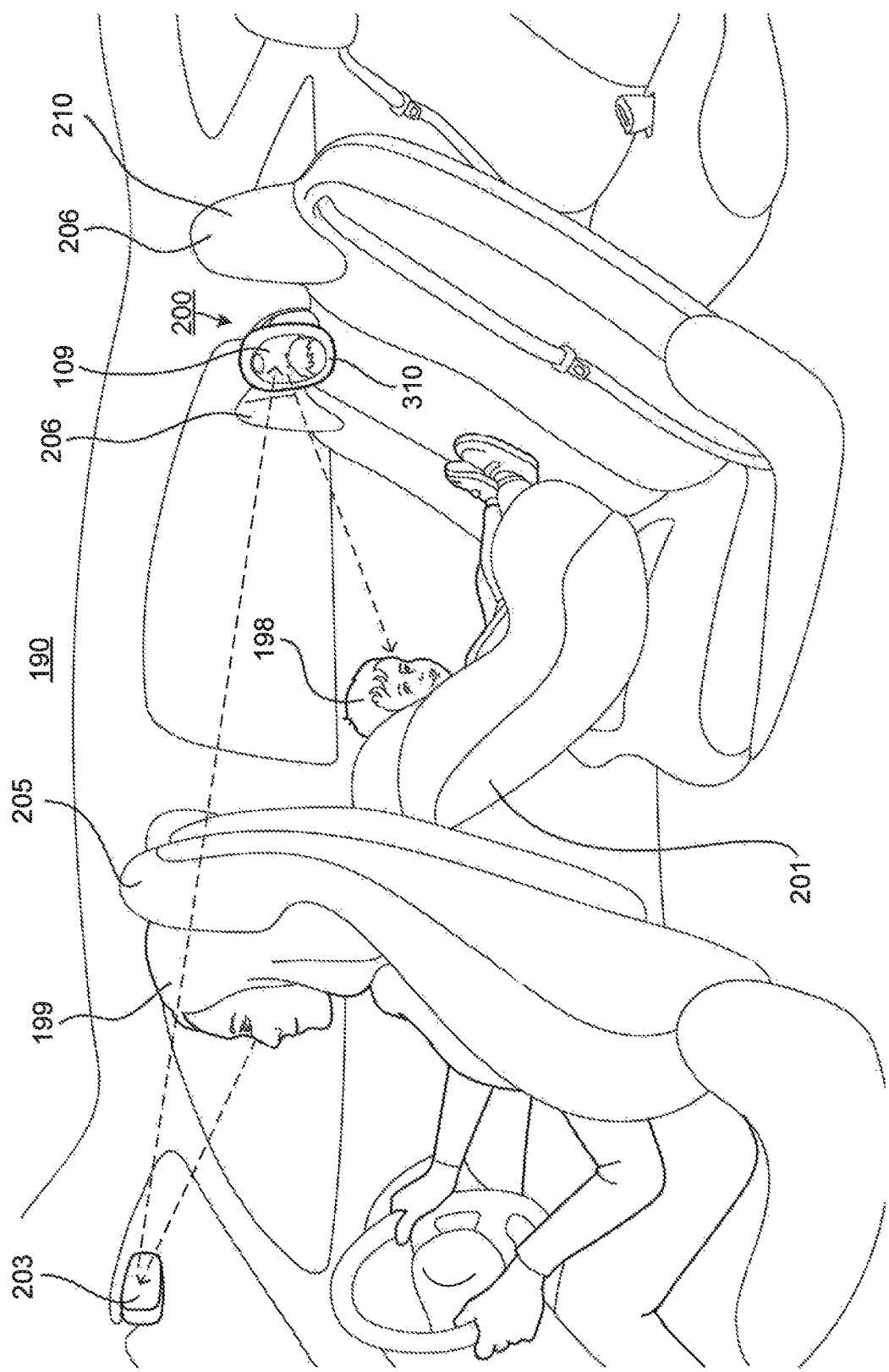
FIG. 15 is a side view inside a vehicle cabin in which a driver is watching the child in the rear facing child safety seat by way of a rear-view mirror and a mirror housed in the mounting assembly.

FIGS. 13-15 show the mounting assembly 200 attached to the rear seat 206 in the "headrest attachment" configuration. The rear seat 206 shown in FIG. 13 may or may not be the rear most seat in the vehicle 190. In the "headrest attachment" configuration, the flap 226 wraps around the headrest bottom surface 212 and the headrest back surface 213.

In the embodiment shown in FIG. 13, the headrest 210 has previously been removed (not shown) from the rear seat 206 in order to insert the headrest posts 209 through the flap aperture 230 to better secure the mounting assembly 200 to the headrest 210. Alternatively, the flap 226 can be threaded through the center of the headrest posts 209 and then wrapped around to the headrest back surface 213. The straps 224 wrap around a headrest left surface 215 and a headrest right surface 216 and attach to the bottom surface 229 of the flap 226. The secondary securing mechanism 222, in this embodiment the tether strap 242, connects the flap distal end 236 to the ring 220 on the back housing 312 to secure the mounting assembly 200 to the headrest 210 in an upright position.

FIG. 15 shows a side view of the inside cabin of a vehicle 190. The driver 199 is able to view the infant 198 secured in a rear-facing child safety seat 201 by way of the line-of-sight established by the rear-view mirror 203 to the mirror 109 in the mounting assembly 200 to the infant 198 in the rear-facing child safety seat 201. The angle of the mirror 109 relative to the headrest 210 can be adjusted to provide the best view of the infant 198 in the rear-facing child safety seat 201 from the rear-view mirror 203 positioned in front of the driver 199 in the vehicle 190.

Figure 17:
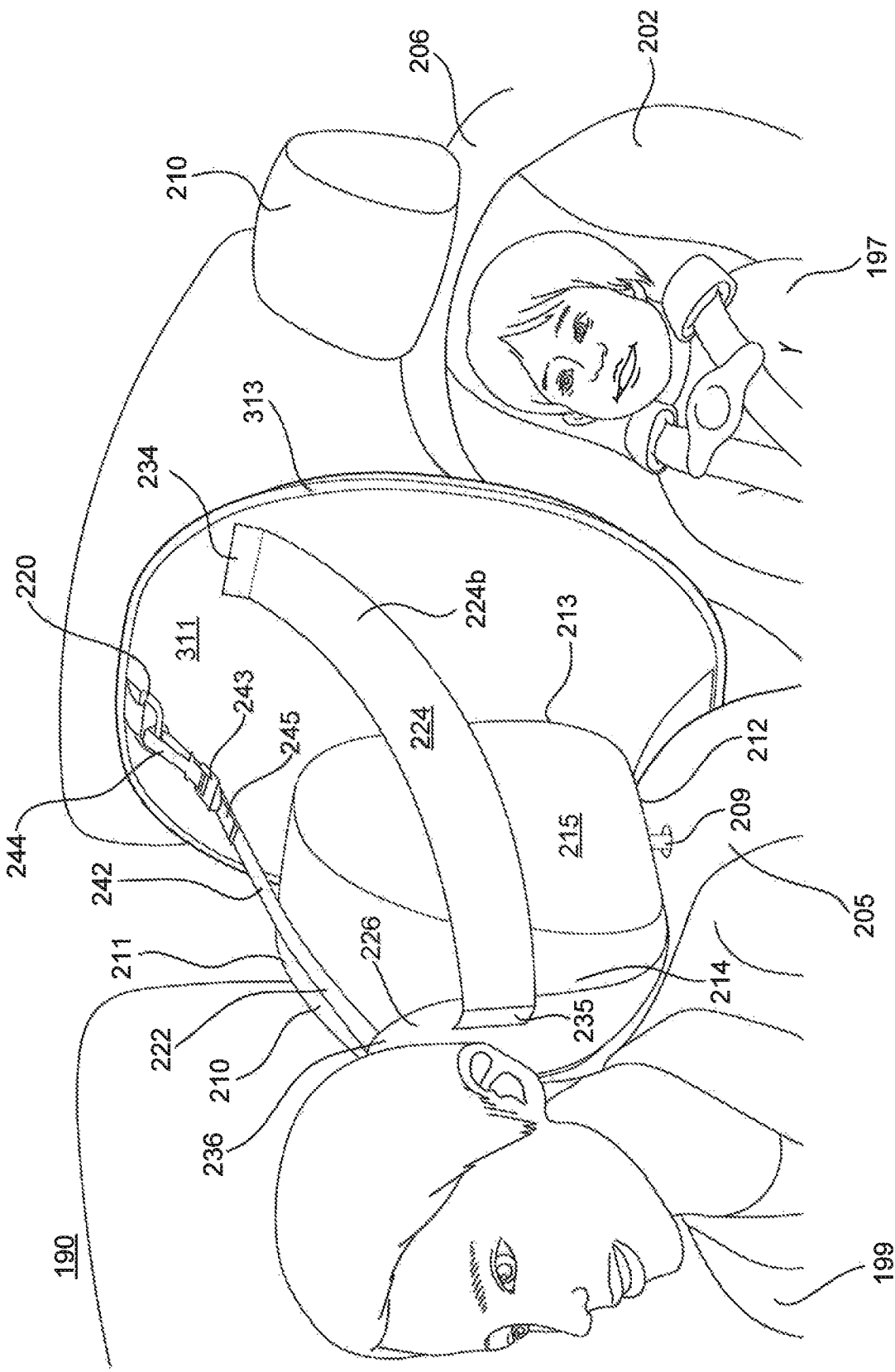
FIG. 17 is a rear perspective of the mounting assembly installed on the headrest of the front seat with the front panel facing the child secured in a forward-facing child safety seat.

FIGS. 16-17 show the mounting assembly 200 attached to the front seat 205 in the "headrest attachment" configuration. This configuration may correspond to use with an older child 197 that is facing forward in a forward-facing child safety seat 202. In this configuration, the mounting assembly 200 is attached to the headrest back surface 213. The flap 226 is threaded through and between the headrest posts 209 and wrapped around the headrest front surface 214. The first strap 224a is wrapped around the headrest right surface 216 (from the perspective of one looking towards the front of the vehicle 190) and the second strap 224b is wrapped around the headrest left surface 215. The straps 224a, 224b are attached to the bottom surface 229 of the flap 226. The secondary securing mechanism 222, in this embodiment the tether strap 242, is looped behind the headrest 210 and the fastener 244 is attached to the ring 220 on the back housing 312 to secure the mounting assembly 200 to the headrest 210 in an upright position. The angle of the housing 311 relative to the headrest 210 can be adjusted by means of the leash 242a that is adjustable in length and the buckle 243 in order to provide the proper angle for facing the older child 197 in the forward-facing child safety seat 202.

Figure 18:
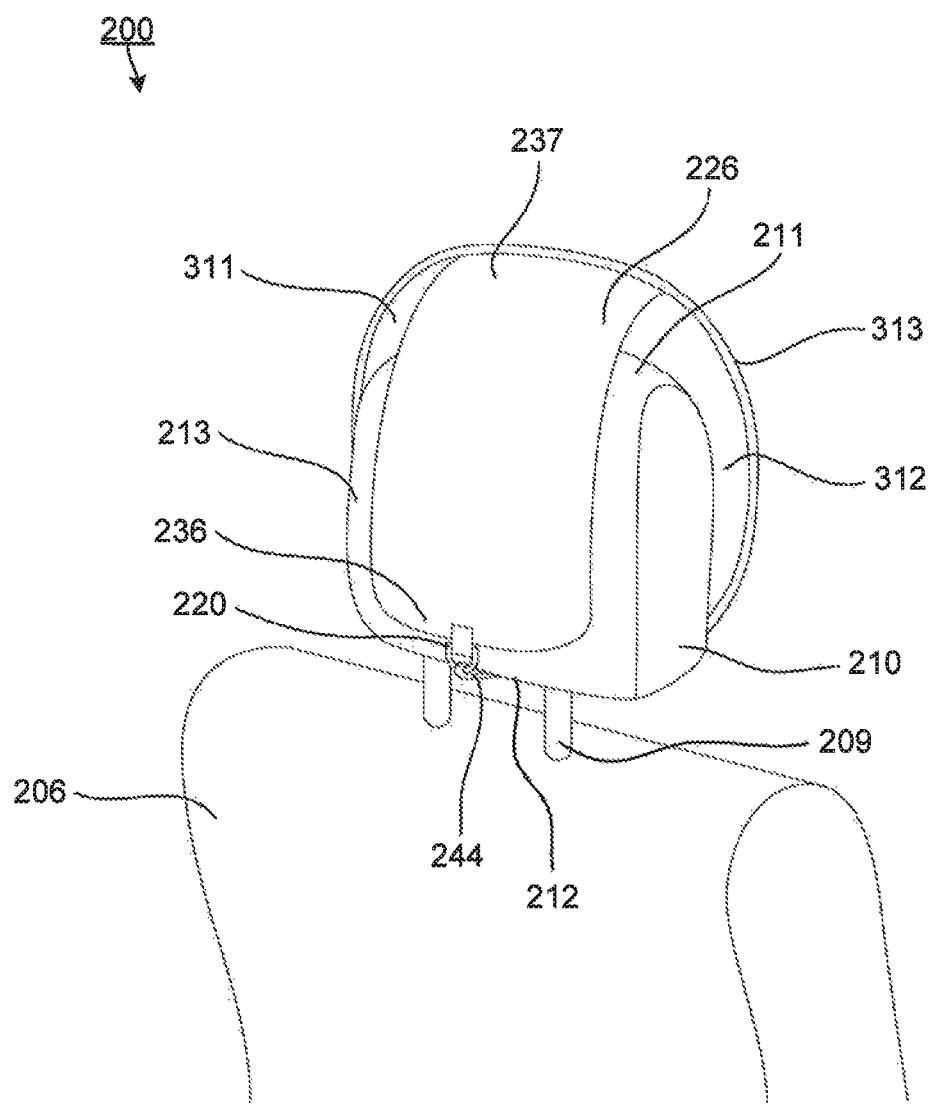
FIG. 18 is a rear perspective of a mounting assembly installed on the headrest of a seat in a vehicle.

FIG. 18 shows the mounting assembly 200 installed on the headrest 210 of a rear seat 206 in a "headrest configuration." In this configuration, a flap proximate end 237 is attached at the top 314 of the back housing 312. A fastener 244 is attached to a tether strap 242 disposed on the bottom 315 (FIG. 19) of the back housing. A complementary mating feature, in this embodiment the ring 220, is disposed on the flap distal end 236. The flap 226 wraps around the headrest top surface 211 and headrest back surface 213 and is attached to the back housing 312 by way of the mating interaction between the fastener 244 and the ring 220. The fastener 244 may also be disposed on the flap distal end 236, with the ring 220 disposed on the bottom 315 of the back housing 312. Alternatively, the flap 226 may wrap around the headrest top surface 211, headrest back surface 213 and headrest bottom surface 212 before attaching directly back to the bottom 315 of the back housing 312 without the use of a tether strap 242. At least one or more straps 224 may be attached to the flap 226 or the housing 311 to secure a tighter fit between the mounting assembly 200 and the headrest 210.

Alternatively, the flap proximate end 237 may be attached at the bottom 315 of the back housing 312 and then wrap around the headrest 210 in the opposite direction and attach to the top 314 of the back housing 312 by way of the fastener 244 and ring 220 (similar to FIG. 18). The flap 226 may have the flap aperture 230 to allow room for the headrest posts 209 to fit within the flap aperture 230. Alternatively, the flap 226 may fit between the headrest posts 209 and wrap around the headrest 210. The fastener 244 may be attached at the top 314 of the back housing 312 and may mate with the ring 220 disposed on the flap distal end 236. Alternatively, the fastener 244 may be disposed on the flap 226 and the ring 220 may be disposed on the housing 311. At least one or more straps 224 may be attached to the flap 226 or the housing 311 to secure a tighter fit between the mounting assembly 200 and the headrest 210.

Figure 19:
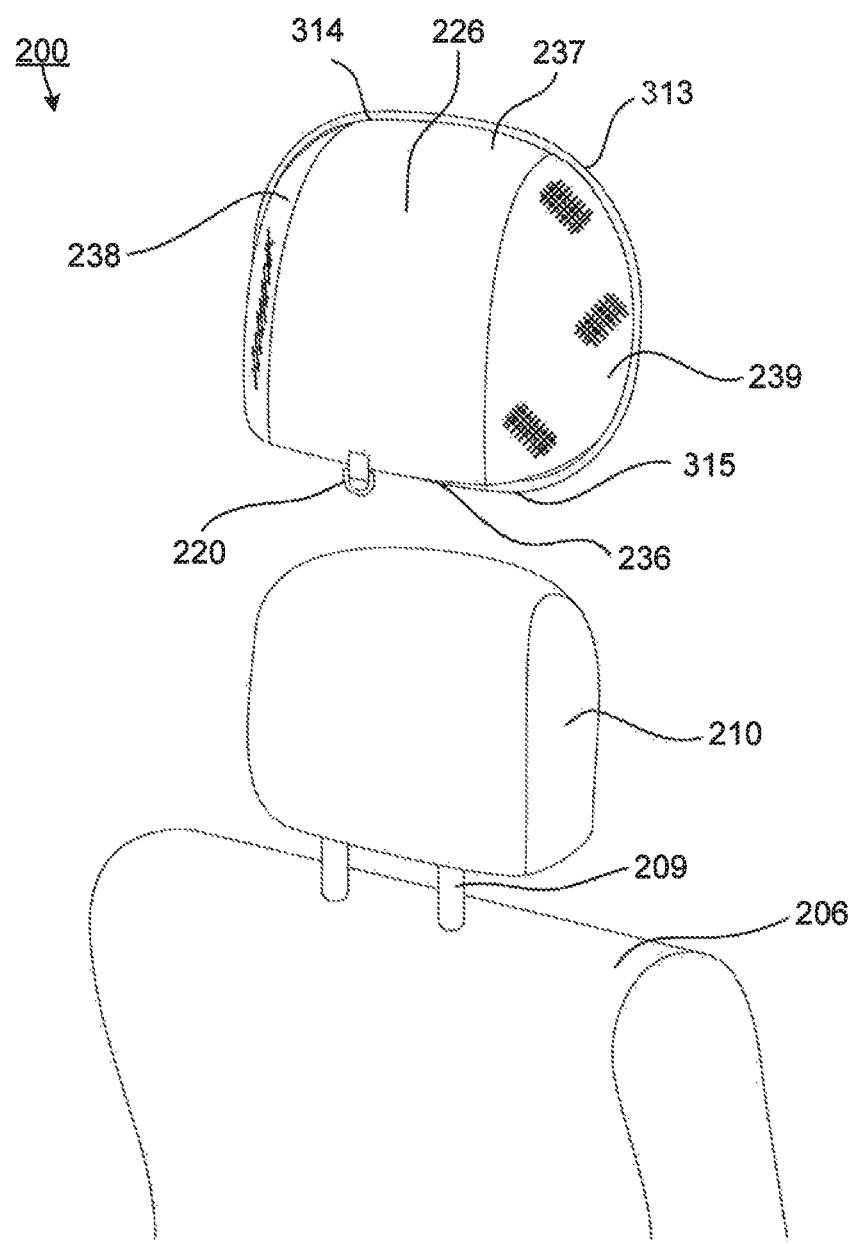
FIG. 19 is a rear perspective of a mounting assembly before installation on the headrest of a seat in the vehicle.
Figure 20:
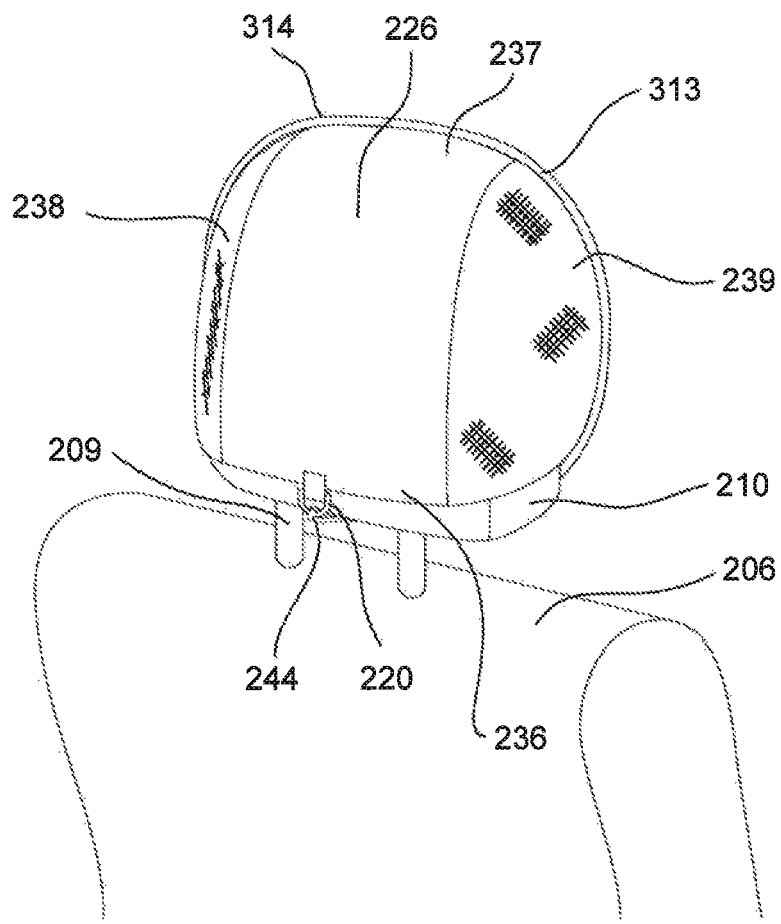
FIG. 20 is a rear perspective of the mounting assembly of FIG. 19 installed on the headrest of the seat in the vehicle.

FIGS. 19-20 show the mounting assembly 200 before installation (FIG. 19) and installed on the headrest 210 (FIG. 20) in a "headrest configuration." In this configuration, the flap proximate end 237 is attached at the top 314 of the back housing 312. The flap 226 includes a first side panel 238 and a second side panel 239 that attach the sides of the flap 226 directly to the back housing 312.

The side panels 238, 239 may be made of a flexible material that enables the flap 226 to slide over the headrest 210 in a tight, contoured fit. For example, the side panels 238, 239 may be made of neoprene, spandex, lycra, elastane, stretchy yarns made of polyester, nylon or natural fibers, stretchy knits, meshes, jersey, interlock, any combination of the above examples, or the like. The side panels 238, 239 bias the flap 226 back to the back housing 312. The fastener 244 is attached to the back housing 312, with the ring 220 disposed on the flap 226. The fastener 244 may alternatively be attached to the flap distal end 236 in order to secure the flap 226 to the back housing 312 at the ring 220. The fastener 244 may be an elastic drawcord, zipper, snap-fit, buttons, hook and loop, and the like. At least one or more straps 224 may be attached to the flap 226 or the housing 311 to secure a tighter fit between the mounting assembly 200 and the headrest 210.

FIG. 21 shows the mounting assembly 200 attached to the rear seat 206 in the "tether attachment" configuration. This configuration employs the tether anchor point 241 included in newer automobiles as mandated by the US federal regulation and particularly through the National Highway Traffic Safety Administration as part of the LATCH (lower anchor and tethers for children) restraint system. LATCH anchorage points are generally used in combination with forward-facing child safety seats 202, however, in the "tether attachment" configuration the tether anchorage point 241 is used to further secure the mounting assembly 200 to the rear seat 206. In the "tether attachment" configuration shown in FIG. 21, the mounting assembly 200 is positioned on a rear seat top surface 207 in order to view an infant 198 secured within a rear-facing child safety seat 201 on that same rear seat 206. The flap 226 is positioned on the rear seat top surface 207 and acts as a base for the mounting assembly 200. The flap 226 is deformable and able to contour to the rear seat top surface 207 for a more secure attachment. The straps 224 are attached to the flap 226 by means of the securing elements 232, 235 and positioned as a support structure for holding the mounting assembly 200 upright in an appropriate position and suitable angle for viewing the infant 198 using the vehicle's rear-view mirror 203 in a conventional manner. The secondary securing mechanism 222, in this embodiment the tether strap 242, extends from the flap distal end 236 and is attached to the tether anchorage point 241 on the back of the rear seat 206 by way of the fastener 244. The buckle 243 is used to adjust the leash 242a and the tether strap 242 overall to an appropriate length that prevents the mounting assembly 200 from falling forward off the rear seat top surface 207.

FIG. 22 illustrates the mounting assembly 200 in use in the "tuck attachment" configuration. In this configuration, the flap 226 is placed over the rear seat top surface 207 and then folded and tucked in the space between the rear seat 206 and the rear shelf 204 of the vehicle 190. The flap 226 is held in place by friction and aided by the anti-skid fabric 218 on the bottom surface 229 of the flap 226. Likewise, the flap 226 is also secured by the bias property of the malleable rigid elements in the flap 226 being clamped onto the rear top surface 207 of the rear seat 206. The straps 224 attach to the top surface 227 of the flap 226 using the securing elements 232, 235 and are positioned as a support structure for holding the mounting assembly 200 upright in an appropriate position and suitable angle for viewing the infant 198 using the vehicle's rear-view mirror 203 in a conventional manner. As shown in FIG. 22, the tether strap 242 can be left untucked in order to be attached to the tether anchorage point 241 provided on the rear shelf 204 for additional stability.

FIG. 23 shows a front view looking inside the cabin of the vehicle 190. The mounting assembly 200 is secured to a rear seat 206 either through the "tether attachment" configuration, or the "tuck attachment" configuration. The driver 199 is able to quickly and safely view the infant 198 secured in a rear-facing child safety seat 201 by way of the line-of-sight established by the rear-view mirror 203 to the mirror 109 in the mounting assembly 200 to the infant 198 in the rear-facing child safety seat 201. A quick glance by the driver 199 to the rear-view mirror 203 establishes the comfort and safety of the infant 198, while prioritizing safe driving and focus on the road.

The illustrations and examples provided herein are for explanatory purposes and are not intended to limit the scope of the appended claims. It will be recognized by those skilled in the art that changes, or modifications may be made to the above described embodiment without departing from the broad inventive concepts of the subject disclosure. It is understood therefore that the subject disclosure is not limited to the particular embodiment which is described but is intended to cover all modifications and changes within the scope and spirit of the subject disclosure.

What is claimed is:

1. A mounting assembly, comprising:
a housing having a front portion and a back portion;
a panel disposed within the front portion of the housing;
a flap attached to a first end of the housing, and having a wire insert along its periphery to allow the flap to bend in a variety of positions or shapes, and which wire enables the flap to act as a base for the housing to lean against; wherein
the flap includes at least one aperture;
at least two straps attached to the back portion of the housing and adapted to be connected to the flap wherein each strap includes a rigid element that supports the housing in an upright position; and
a securing device attached to the flap wherein;
in a first configuration, the securing device wraps around a headrest of a seat in a vehicle and connect the flap to a complementary securing element at a second end of the housing, and,
in a second configuration, the securing device connects the flap to an anchor in the vehicle; wherein
the at least two straps, the flap, and the securing device secure the housing to the vehicle.

2. The mounting assembly of claim 1, wherein the flap is adapted to be contoured to an upper portion of the seat in the vehicle.

3. The mounting assembly of claim 1, wherein the at least two straps are adapted to wrap around the headrest and secure a distal end of the flap to the housing.

4. The mounting assembly of claim 1, wherein the securing device secures the housing to the anchor at a point on a rear shelf.

5. The mounting assembly of claim 1, wherein the securing device is a tether strap comprising:
a leash;
a fastener; and
a buckle,
wherein a first end of the leash is attached to a distal end of the flap and a second end of the leash is adjustably connected by the buckle to the fastener, wherein
the fastener is secured to the complementary securing element on the back portion of the housing or to the anchor in the vehicle.

6. The mounting assembly of claim 1, wherein the complementary securing element is a ring.

7. A mounting assembly, comprising:
a panel disposed in a front portion of a housing;
at least two straps attached to a back portion of the housing wherein each strap includes a rigid element that supports the housing in an upright position; and
a deformable flap having at least one aperture, the flap comprising:
a proximate end attached to a first end of the back portion of the housing;
a distal end extending away from the housing;
a wire insert along its periphery to allow the flap to bend in a variety of positions or shapes, and which wire enables the flap to act as a base for the housing to lean against;
a securing device attached to the distal end of the flap, wherein;
in a first configuration, the securing device wraps around headrest of a seat in a vehicle and connects the flap to a complementary securing element at a second end of the back portion of the housing, and,
in a second configuration, the securing device connects the flap to an anchor in a vehicle; wherein
the flap is adapted to contour to at least one surface of a vehicle seat, and wherein the at least two straps and the flap secure the housing to the at least one surface of the seat.

8. The mounting assembly of claim 7, wherein the securing device is a tether strap comprising:
a leash;
a fastener; and
a buckle,
wherein a first end of the leash is attached to the distal end of the deformable flap and a second end of the leash is adjustably connected by the buckle to the fastener, wherein the fastener is secured to the complementary securing element on the back portion of the housing or to the anchor in the vehicle.

9. A mounting assembly, comprising:

a panel disposed in a front portion of a housing; and a deformable flap having an aperture, the flap comprising:
- a proximate end attached to a first end of a back portion of the housing;
- a distal end having an attachment element, and
- a wire insert along its periphery to allow the flap to bend in a variety of positions or shapes, and which wire enables the flap to act as a base for the housing to lean against;

at least two straps one strap attached to the back portion of the housing, each strap having a rigid element that supports the housing in an upright position; and the attachment element comprising a securing device attached to the distal end of the flap, wherein;
- in a first configuration, the securing device wraps around a headrest of a seat in a vehicle and connects the flap to a complementary securing element at a second end of the back portion of the housing, and
- in a second configuration, the securing device connects to an anchor in the vehicle;

wherein the flap is adapted to contour and secure the mounting assembly to at least one surface of a seat.

10. The mounting assembly of claim 9, wherein the securing device is a tether strap comprising:

a leash;

a fastener; and a buckle, wherein a first end of the leash is attached to the attachment element and a second end of the leash is adjustably connected by the buckle to the fastener, wherein the fastener is secured to the housing or to the anchor in the vehicle.

* * * * *